United States Patent [19]
Kamoi et al.

[11] Patent Number: 6,026,098
[45] Date of Patent: Feb. 15, 2000

[54] LINE MULTIPLEXING SYSTEM

[75] Inventors: Jyoei Kamoi; Tomoyuki Yamaguchi; Mikio Nakayama; Yuzo Okuyama, all of Kanagawa, Japan

[73] Assignee: Fujitsu Limited, Kanagawa, Japan

[21] Appl. No.: 08/931,638

[22] Filed: Sep. 16, 1997

[30] Foreign Application Priority Data

Mar. 18, 1997 [JP] Japan ................................. 9-064025

[51] Int. Cl.[7] .................................................. H04L 12/56
[52] U.S. Cl. ............................................. 370/539; 370/541
[58] Field of Search .................................. 370/395, 537, 370/538, 539, 540, 541, 387, 388

[56] References Cited

U.S. PATENT DOCUMENTS 4,782,478 11/1988 Day, Jr. et al. ........................ 370/356
5,123,015 6/1992 Brady, Jr. et al. ..................... 370/539
5,526,353 6/1996 Henley et al. ......................... 370/392

FOREIGN PATENT DOCUMENTS 5-68047 3/1993 Japan .

*Primary Examiner*—Douglas W. Olms
*Assistant Examiner*—Kenneth Vanderpuye
*Attorney, Agent, or Firm*—Helfgott & Karas, PC.

[57] ABSTRACT

A plurality of input lines are respectively connected to separate multiplexing units that are connected in cascade by cascading lines. Select signals are transferred in parallel with fixed length packets over the cascading lines. Each separate multiplexing unit is responsive to a select signal received from the cascading line to select one of fixed length packets received over the corresponding input line and the upstream cascading line and output it over the downstream cascading line. The most downstream separate multiplexing unit provides a multiplexed output of the input lines.

32 Claims, 17 Drawing Sheets

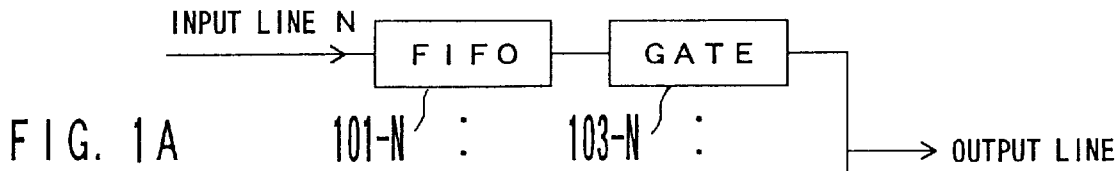
FIG. 1A
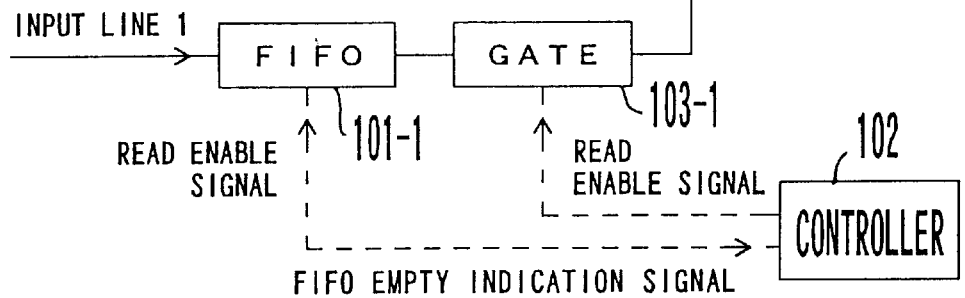
FIG. 1B
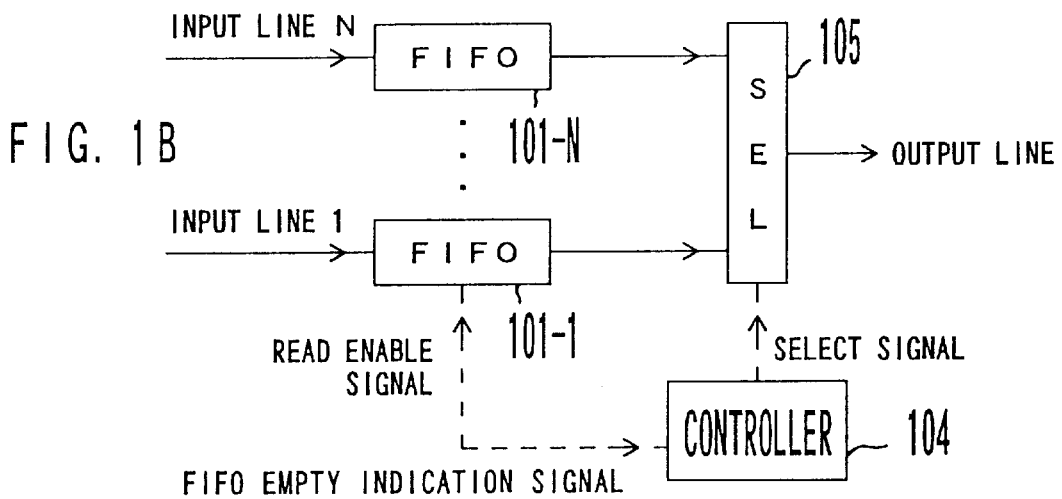
FIG. 1C
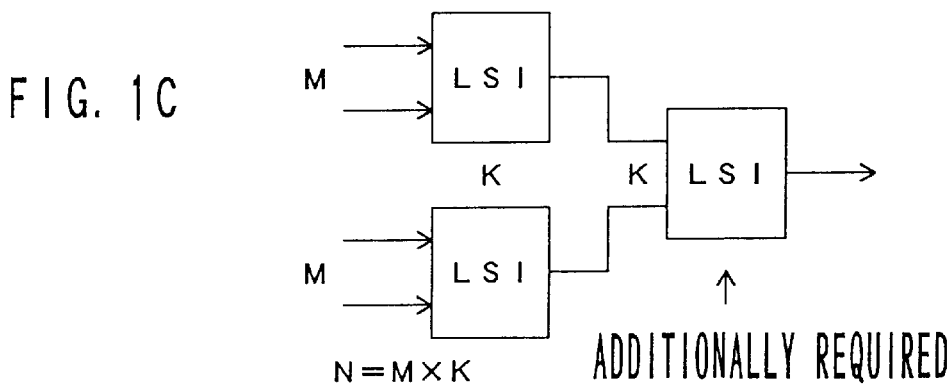

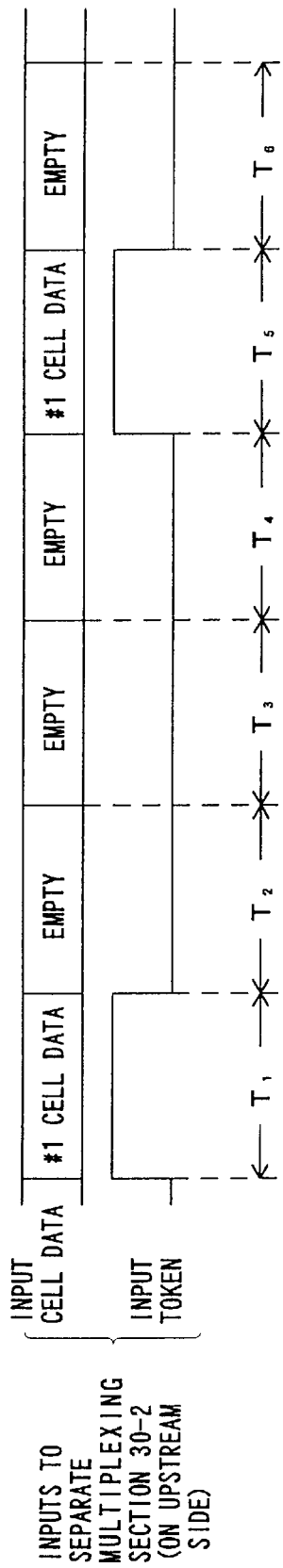
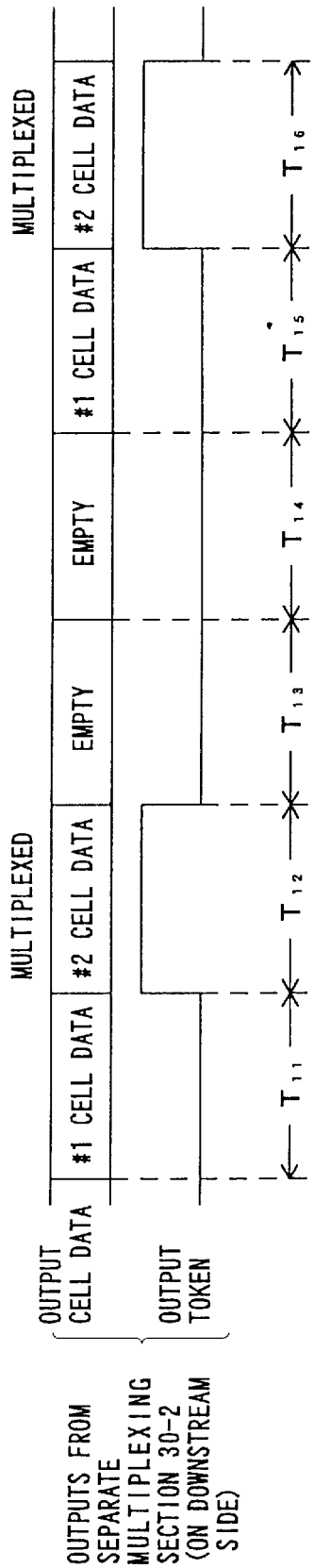
F I G. 8A
F I G. 8B

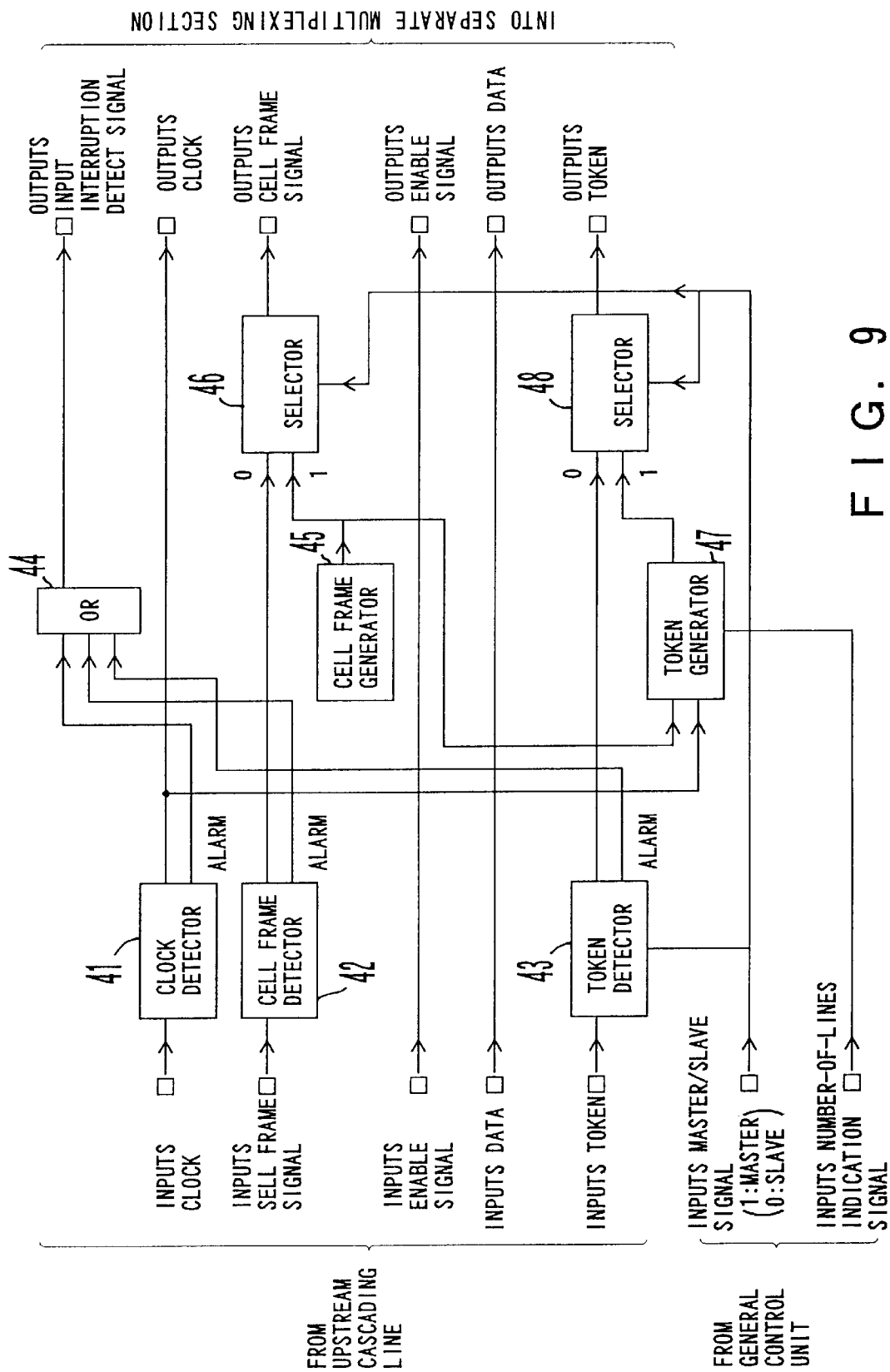
F I G. 9

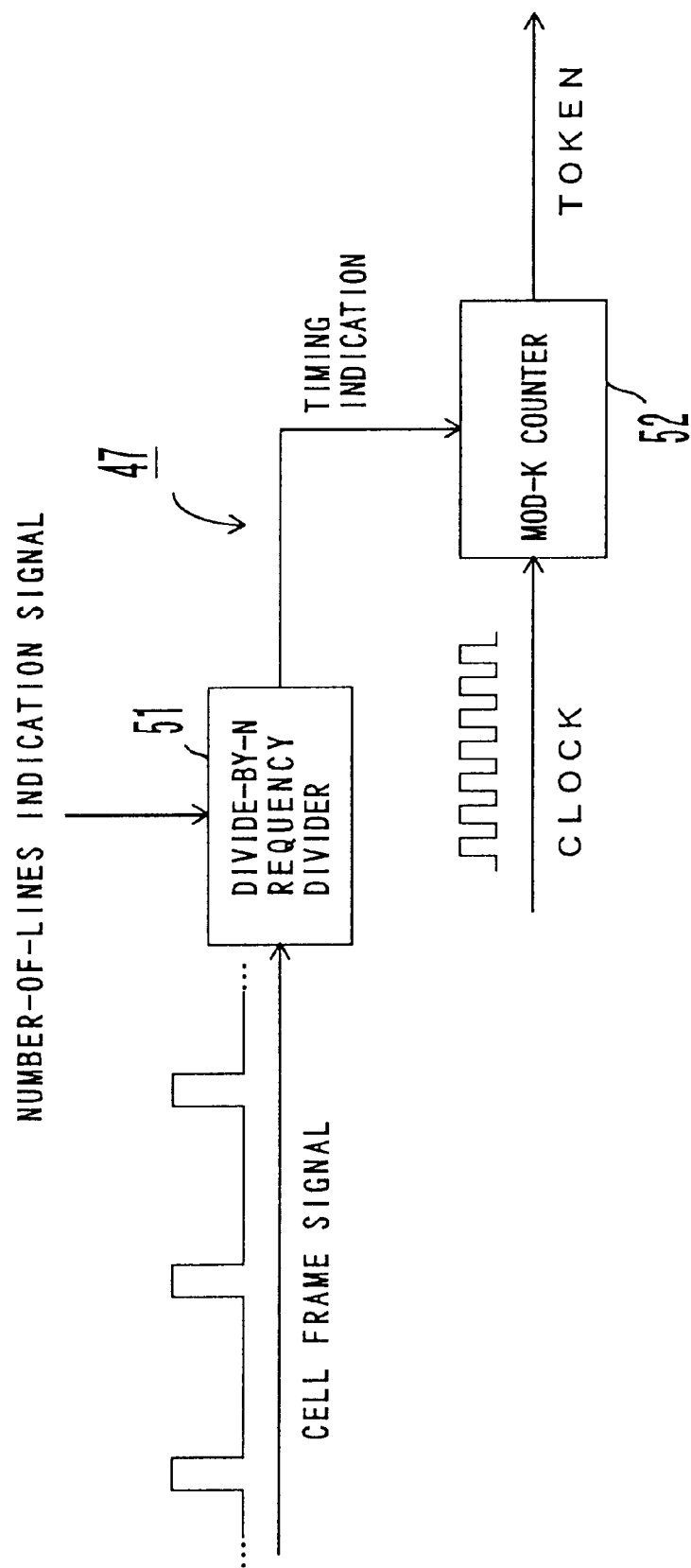
F I G. 10

FIG. 11A | TAG=#1 | TAG=#2 | TAG=#3 | TAG=#4 | TAG=#1 | ...

MULTIPLEXED

FIG. 11B | #1 CELL DATA | TAG=#2 | TAG=#3 | TAG=#4 | #1 CELL DATA | ...

MULTIPLEXED

FIG. 11C | #1 CELL DATA | #2 CELL DATA | TAG=#3 | TAG=#4 | #1 CELL DATA | ...

| INPUT LINE NUMBER | TAG |
|---|---|
| # 1 | 0 0 0 0 0 0 0 1 |
| # 2 | 0 0 0 0 0 0 1 0 |
| # 3 | 0 0 0 0 0 0 1 1 |
| ⋮ | ⋮ |
| # N | BINARY NUMBER REPRESENTING "N" |
| ⋮ | ⋮ |

F I G. 1 3 A

F I G. 1 3 B

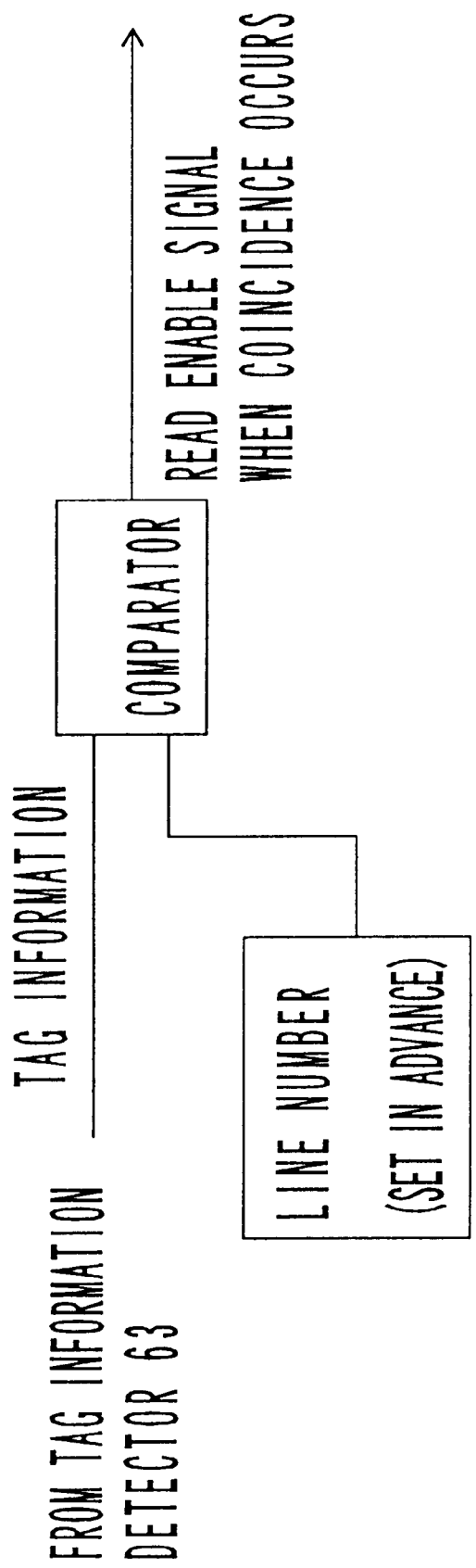
F I G. 14

FIG. 15A

| INPUTS TO SEPARATE MULTIPLEXING SECTION 30-2 (ON UPSTREAM SIDE) | INPUT CELL DATA | #1 CELL DATA | EMPTY | EMPTY | EMPTY | #1 CELL DATA | EMPTY |
| --- | --- | --- | --- | --- | --- | --- | --- |
| | INPUT TAG | #1 | #2 | #3 | #4 | #1 | #2 |

MULTIPLEXED

FIG. 15B

| OUTPUTS FROM SEPARATE MULTIPLEXING SECTION 30-2 (ON DOWN-STREAM SIDE) | OUTPUT CELL DATA | #1 CELL DATA | #2 CELL DATA | EMPTY | EMPTY | #1 CELL DATA | #2 CELL DATA |
| --- | --- | --- | --- | --- | --- | --- | --- |
| | OUTPUT TAG | #1 | #2 | #3 | #4 | #1 | #2 |

MULTIPLEXED

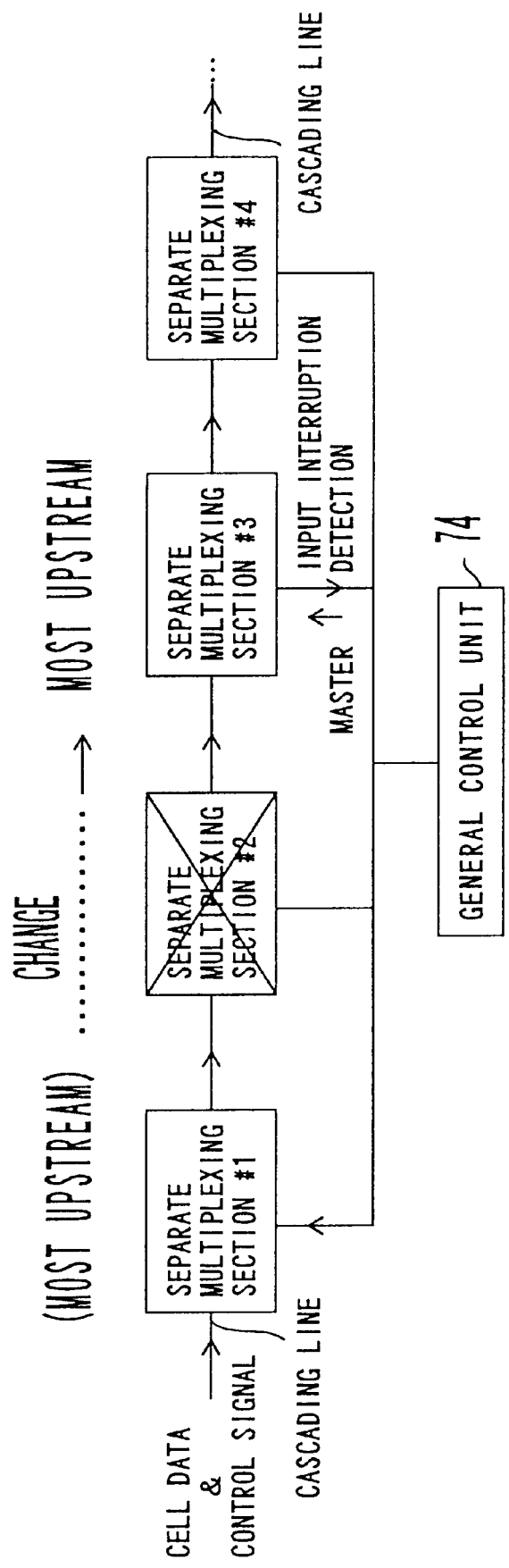
F I G. 17

LINE MULTIPLEXING SYSTEM

BACKGROUND OF THE INVENTION

1. Field of the Invention

The present invention relates to a multiplexing system, provided in a line terminating unit of an ATM switch which accommodates a plurality of physical lines, which multiplexes fixed-length packets received over input lines on an output line connected to an ATM layer terminating apparatus, and more specifically to a multiplexing system adapted for an arrangement in which the bandwidth of the multiplexed output line is equal to or greater than the sum of the bandwidths of the input lines.

2. Description of the Related Art

In recent years, services haves become indispensable that uniformly handle various forms of communications, including not only transmissions of voice data and text data, but also transmissions of image data for which higher transmission or bit rates are required. As one of the major technologies that help to conduct such communications services, the ATM (asynchronous transfer mode) technique has been widely used.

In the ATM, information is transmitted on a cell-by-cell basis. Each cell consists of 48 octets of payload, and 5 octets of control information (including routing information) called the header.

Usually, ATM cells have their routes switched in a switch to which incoming lines and outgoing lines are connected. That is, upon receipt of a cell over an incoming line, the switch outputs it onto an outgoing line according to the routing information carried in its header. Thus, the cell can be routed to its destination.

The switch usually accommodates a large number of lines. However, it is usual that the number of ports (input ports or output ports) of a switching device involved in actual switching is considerably smaller than that of the lines accommodated, say, eight; this is because high-speed processing is achieved by taking advantage of statistical multiplexing. To input incoming cells received over the many input lines into the switching device, therefore, it is required to multiplex the incoming cells. Methods of multiplexing incoming lines include time-division multiplexing, statistical multiplexing, etc. Here, "multiplexing incoming lines" means, in this case, to multiplex cells coming from the incoming lines.

In the time-division multiplexing, the sum of bandwidths of input lines connected to a multiplexer is equal to or less than the bandwidth of the output line of the multiplexer, and each input line is assigned a portion of the bandwidth of the output line. The bandwidth assigned to each input line is referred to as a slot on the time base. Each cell inputted to the multiplexer over an input line is output onto the output line in a state where it is placed in the slot assigned to that input line.

The statistical multiplexing is generally applied to the arrangement in which the sum of the bandwidths of input lines of a multiplexer is greater than the bandwidth of the output line. The statistical multiplexing is a technique that employs the nature that the timing of the peak of traffic on each input line occurs at random and smoothes the peak of the total traffic by multiplexing such input lines.

The statistical multiplexing has an advantage that it can transmit large amounts of information with a low bandwidth. However, when congestion occurs, cells will be discarded. In order to avoid cells being discarded, the statistical multiplexing needs very complicated congestion control. With the time-division multiplexing, however, although the statistical multiplexing effect is not achieved, cells will not be discarded when they are multiplexed together. Thus, the time-division multiplexing is used for multiplexing incoming cells while avoiding cell congestion without complicated congestion control.

FIGS. 1A through 1C show block diagrams of a conventional time-division multiplexer. FIG. 1A is a block diagram of a WIRED-OR type multiplexer. Cells received over input lines 1 to N are respectively written into cell data storage FIFO memories 101-1 to 101-N. A controller 102 outputs read enable signals to the FIFO memories 101-1 to 101-N and gates 103-1 to 103-N in a cyclic manner. Upon receipt of a read enable signal from the controller 102, each of the FIFO memories 101-1 to 101-N reads a cell out. Upon receipt of the read enable signal from the controller 102, each of the gates 103-1 to 103-N outputs a cell read out from the corresponding FIFO memory onto the output line. The outputs of the respective gates 103-1 to 103-N are physically connected to a single line (output line). In this way, the input lines 1 to N are selected in a cyclic manner and thus cells received over the input lines are outputted in sequence onto the output line formed by connecting the gate outputs in a WIRED-OR connection.

When each of the FIFO memories is empty, it sends a FIFO empty indication signal to the controller 102 to make notification that no cell is stored. The controller 102 outputs no read enable signal to the FIFO memory that is outputting the FIFO empty indication signal.

FIG. 1B is a block diagram of a MUX type multiplexer. This type of multiplexer is equipped with a selector 105 on the output side of the FIFO memories 101-1 to 101-N. A controller 104 outputs a read enable signal to each of the FIFO memories in a cyclic manner and outputs a select signal to the selector 105. As with the WIRED-OR type multiplexer, each of the FIFO memories is responsive to a read enable signal to output a cell. The selector 105 selects an input line specified by the select signal to output a cell received over the selected input line onto the output line. In this way, each of the input lines 1 to N is selected in a cyclical manner and a cell received over the selected input line is sent over the output line.

The conventional techniques have the following drawbacks. In the WIRED-OR type, increasing the number of input lines results in an increase in the load capacitance associated with the output line connected in a WIRED-OR connection, causing rounding of pulse waveforms. As a result, cells from different input lines will collide with one another, making high-speed processing difficult.

In the MUX type, on the other hand, the selector 105 is installed independently of the circuits associated with the input lines (the FIFO memories, etc); thus, the multiplexer cannot flexibly adapt itself to a change in the number of the input lines. In addition, the MUX type multiplexer has a drawback that, when a large number N of input lines are divided into K groups of M lines (N=M×K) and an LSI is used to service each group of M input lines as shown in FIG. 1C, the multiplexing of N inputs sill require an additional LSI to combine the outputs of the K LSIs into a multiplexed signal.

SUMMARY OF THE INVENTION

It is an object of the present invention to provide a high-speed multiplexing system which allows a system modification to be accommodated flexibly.

A line multiplexing system of the present invention is arranged to multiplex fixed length packets received over input lines on an output line. The line multiplexing system includes a plurality of separate multiplexing units with which the input lines are connected respectively and cascading lines that connect the separate multiplexing units in cascade. Each of the separate multiplexing unit multiplexes a fixed length packet received from the upstream cascading line and a fixed length packet received over its associated input line, and sends the multiplexed fixed length packets over its associated downstream cascading line. Among the separate multiplexing units connected in cascade, the most downstream separate multiplexing unit provides a multiplexed output signal on the output line.

A line multiplexing system of another embodiment of the present invention multiplexes fixed length packets received over input lines on a multiplexed output line the bandwidth of which is equal to or greater than the sum of the bandwidths of the input lines. The line multiplexing system includes a plurality of separate multiplexing units with which the input lines are connected respectively, cascading lines that connect the separate multiplexing units in cascade, and a multiplexing permission signal generating unit for generating a multiplexing permission signal every period N×T where N is the number of the input lines and T is the lime required to transfer one fixed length packet over the cascading line, and outputting it onto the cascading lines. At the time when the multiplexing permission signal is received from the upstream cascading line, the separate multiplexing unit sends a fixed length packet received over its associated input line to the downstream cascading line together with the multiplexing permission signal. At the time when the multiplexing permission signal is not received, the separate multiplexing unit sends a fixed length packet received from the upstream cascading line to the downstream cascading line. Among the separate multiplexing units connected in cascade, the most downstream separate multiplexing unit provides a multiplexed output signal on the output line.

Still another line multiplexing system of the present invention is arranged to multiplex fixed length packets received over input lines on a multiplexed output line, the bandwidth of which is equal to or greater than the sum of the bandwidths of the input lines. The line multiplexing system comprises separate multiplexing units with which the input lines are connected respectively, a line identification number being set up on each of the separate multiplexing units to identify its associated input line, cascading lines for connecting the separate multiplexing units in cascade, and a packet generation unit for generating a set of fixed length packets each having tag information corresponding to a respective one of the line identification numbers added and sequentially sending each of the fixed length packets over the cascading lines. When the line identification number specified by the tag information in a fixed length packet received from the upstream cascading line coincides with the line identification number for its associated input line, the separate multiplexing unit sends a fixed length packet received over its associated input line to the downstream cascading line. When no coincidence occurs, the separate multiplexing unit sends a fixed length packet received from the upstream cascading line to the downstream cascading line. Among the separate multiplexing units connected in cascade, the most downstream separate multiplexing unit provides a multiplexed output signal on the multiplexed output line.

BRIEF DESCRIPTION OF THE DRAWINGS

FIG. 1A is a block diagram of a conventional WIRED-OR type multiplexer;

FIGS. 1B and 1C are block diagrams of conventional MUX type multiplexers;

FIGS. 8A and 8B show signals transferred over the cascading lines in the multiplexer of FIG. 7;

FIG. 9 shows an arrangement of the input section of FIG. 7;

FIG. 10 shows an arrangement of the token generator of FIG. 9;

FIGS. 11A, 11B and 11C are diagrams for use in explanation of the operation of a tag-based multiplexing arrangement;

FIG. 14 is a block diagram for explaining the tag-based comparison processing in the tag multiplexing arrangement;

FIGS. 15A and 15B show a method of transferring a multiplexing timing indication signal in another type of multiplexing arrangement;

FIG. 17 shows another multiplexing arrangement having a function of reducing the effect of a failure.

DETAILED DESCRIPTION OF THE PREFERRED EMBODIMENTS

Figure 2:
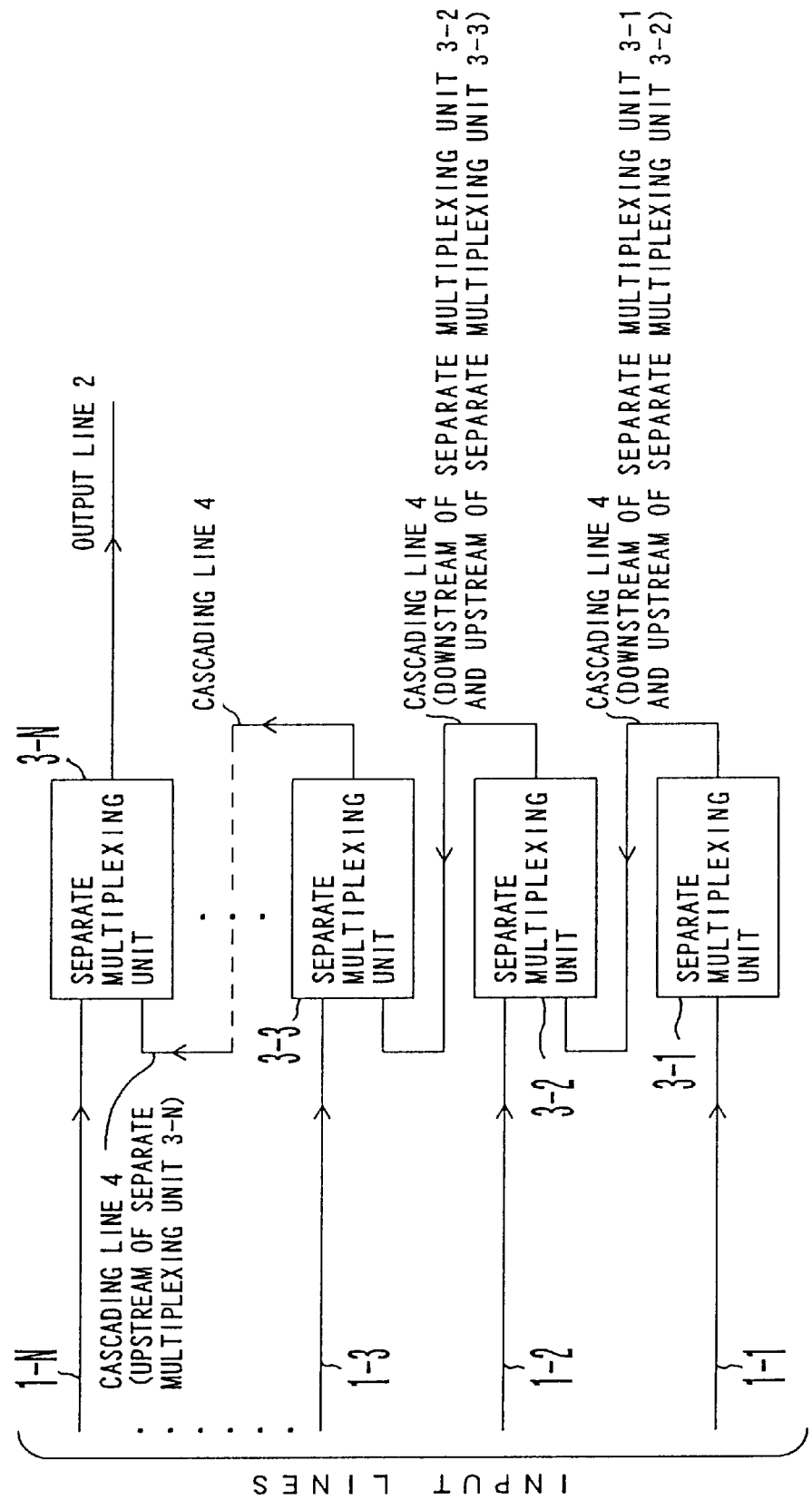
FIG. 2 illustrates the principles of the present invention.

The basic configuration of a line multiplexing system of the present invention will be described below with reference to FIG. 2. The multiplexing system of the present invention is configured such that fixed length packets received over input lines 1-1 to 1-N are multiplexed together on an output line 2 and includes separate multiplexing sections or units 3-1 to 3-N which are respectively connected to the input lines 1-1 to 1-N and cascading lines 4 which connect the separate multiplexing units 3-1 to 3-N in cascade. On the cascading line 4, data (including a fixed length packet) are transmitted in ones direction; from separate multiplexing unit 3-1 to separate multiplexing unit 3-2, from separate multiplexing unit 3-2 to separate multiplexing unit 3-3, . . . . To prevent fixed length packets from being discarded, the sum of the bandwidths of the input lines 1-1 to 1-N is set equal to or less than the bandwidth of the output line 2.

Each separate multiplexing unit 3-i (i=1, 2, . . . , or N) multiplexes a fixed length packet received over its upstream cascading line 4 and a fixed length packet received over its associated input line 1-i with the former given precedence over the latter and outputs the resulting fixed length packet onto its downstream cascading line 4. The separate multiplexing unit 3-N that is the most downstream one of the separate multiplexing units 3-1 to 3-N outputs the multiplexed signals onto the output line 2.

In this manner, the input lines are connected in cascade by the use of the separate multiplexing sections each corresponding to a respective one of the input lines, and a fixed length packet received over each input line is multiplexed in turn. For this reason, a change in the number of input lines can be accommodated flexibly. In addition, since the multiplexed output line is not connected in a WIRED-OR connection, the multiplexing can be implemented at high speed.

There are two methods of control as to which of a packet received over the upstream cascading line and a packet received over the corresponding input line 1-i connected to the separate multiplexing unit 3-i is to select.

According to the first method, a multiplexing enable signal is output over the cascading line 4 every period N×T where N is the number of input lines and T is the time required to transfer a fixed length packet over the cascading line. The separate multiplexing unit 3-i is allowed to output a packet received over the corresponding input line 1-i onto its downstream cascading line only when it receives the multiplexing enable signal over the cascading line.

According to the second method, a number of fixed length packets are produced each of which has tag information added that corresponds to a respective one of identification numbers that identify the input lines 1-1 to 1-N and each of the packets is then sent in turn over the cascading line. The separate multiplexing unit 3-i is allowed to output a packet received over the corresponding input line 1-i onto its downstream cascading line only when the line identification number specified by the tag information carried in a packet received over its upstream cascading line coincides with the identification number of the corresponding input line 1-i.

The embodiments of the present invention will be described below with reference to the drawings. In the following, an ATM system is taken as an example of an communications system to which the multiplexing device of the present invention is applied.

Figure 3:
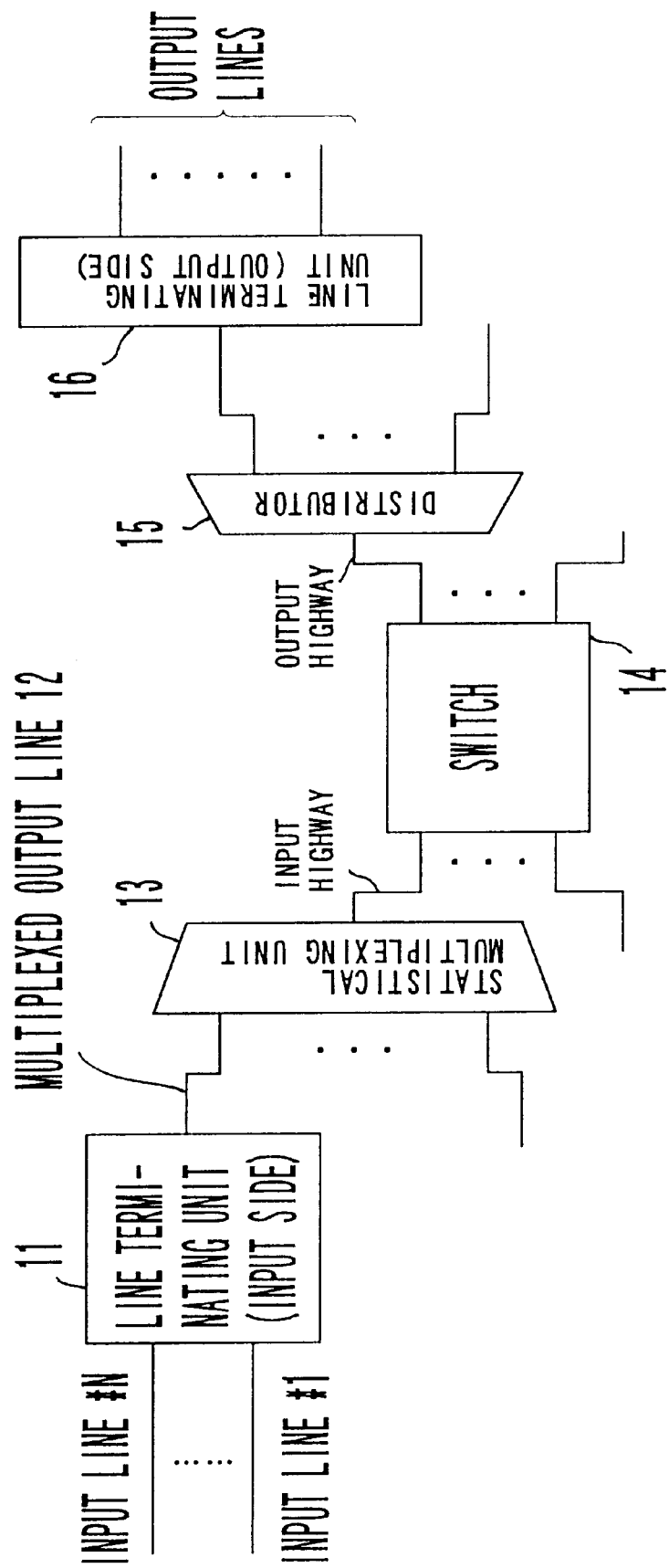
FIG. 3 shows an arrangement of an ATM switch to which a multiplexing arrangement of the present invention is applied.

FIG. 3 is a schematic illustration of an ATM switch to which the multiplexing device of the present invention is applied. The ATM switch accommodates a number of input lines and a number of output lines and outputs an incoming cell onto an output line in accordance with routing information carried in the header of that cell. Thus, the cell is routed to its destination specified by the routing information.

Line terminating unit 11 terminates input lines #1 to #N. The input lines #1 to #N transmit, for example, SONET frames. The line terminating unit 11, as will be described later, has cell delineation units for each of the input lines and a multiplexing unit which multiplexes the output of the cell delineation units. That is to say, the line terminating unit 11 delineates cells from data received over the input lines and multiplexes the cells on the multiplexed output line 12.

A statistical multiplexing unit 13 has its inputs connected to a number of multiplexed output lines 12 and its output connected to a multiplexed input highway to an ATM switch 14. In the statistical multiplexing unit 13, cells on the multiplexed output lines 12 are multiplexed statistically and then sent to the ATM switch over the input highway. The sum of the bandwidths of the multiplexed output lines 12 connected to the inputs of the statistical multiplexing unit 13 is usually set equal to or greater than that of the input highway. For example, the bandwidth of the input highway is equal to that of each multiplexed output line 12, i.e., 2.4 Gbps (=2.4 GHz).

The switch 14 is a self-routing switch, which outputs a cell transferred over an input highway on an output highway specified by routing information carried in the header. The cell on the output highway is sent over an output line by distributors 15 and line terminating unit 16.

The multiplexing device of the present embodiment is provided in the line terminating unit 11.

Figure 4:
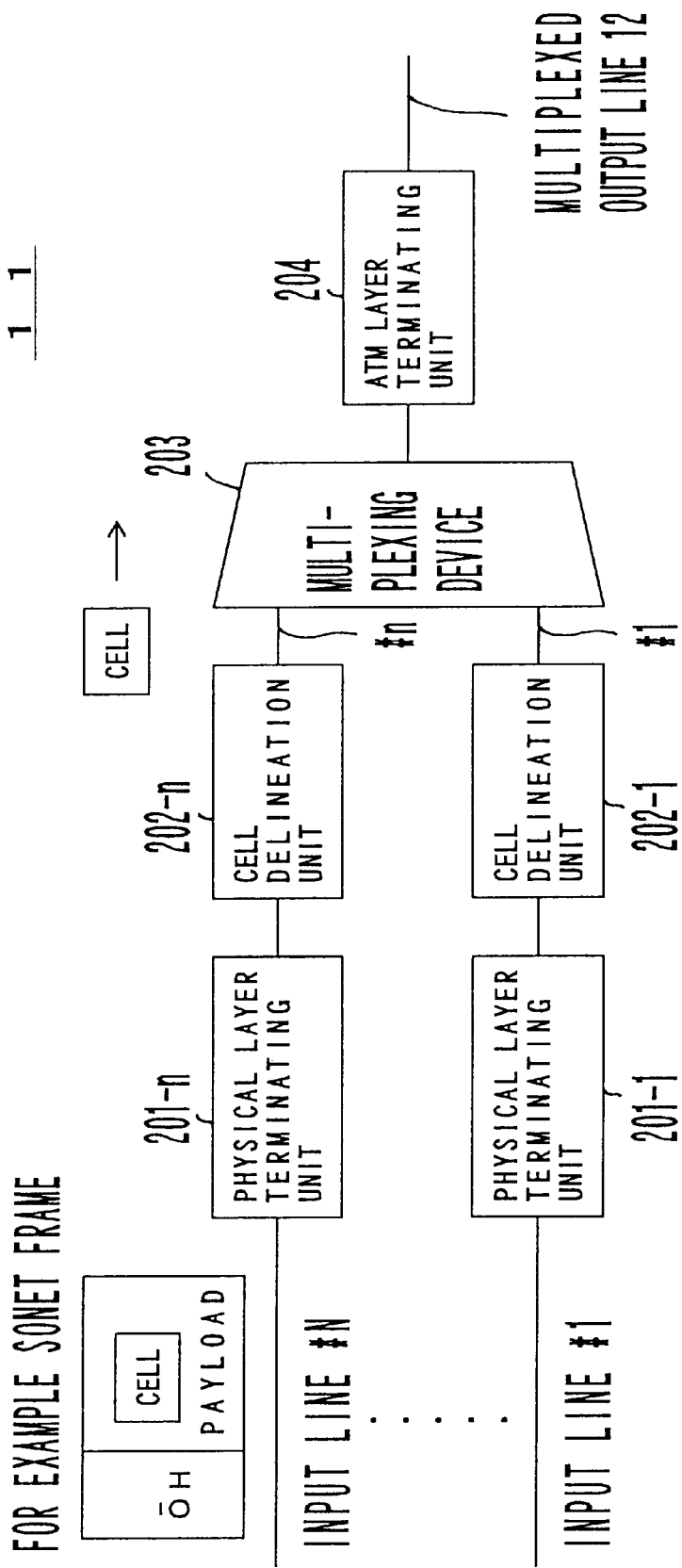
FIG. 4 shows an arrangement of a line terminating unit.

FIG. 4 shows the configuration of the line terminating unit 11 provided at the input terminal of the ATM switch. Physical layer terminating units 201-1 through 201-n terminate input lines #1 through #N respectively. The input lines #1 through #N transmit, for example, a standardized data frame of SONET, etc. The physical layer terminating units 201-1 through 201-n perform a synchronizing process and a warning process on a received data frame, and extract the payload. The payload stores an ATM cell.

Cell delineation units 202-1 through 202-n are provided for the input lines #1 through #N respectively, and detect ATM cells from the payload extracted by each of the physical layer terminating units 201-1 through 201-n using the HEC of each ATM cell. At this time, the cells are synchronized.

A multiplexing device 203 multiplexes the output from the cell delineation units 202-1 through 202-n. A line connecting each of the cell delineation units 202-1 through 202-n to the multiplexing device 203 is an input line to the multiplexing device 203. The multiplexing device 203 refers to the multiplexing system according to the present invention.

An ATM layer terminating device 204 performs a routing process, an OAM (operation, administration, and maintenance) process, etc. on an ATM cell output from the multiplexing device 203, and transmits the ATM cells on the multiplexed output line 12.

With the above described configuration, the physical layer terminating unit and the cell delineation unit should be provided for each input line because they are operated based on the clocks having different phases for respective input lines. However, since the cells have been synchronized when the ATM layer terminating unit receives this cells, all input lines can be collectively processed.

Here, it is made a condition that the sum of the bandwidths of the input lines #1 to #N (input lines of the multiplexing device 203) is equal to or less than the bandwidth of the multiplexed output line 12 (output line of the multiplexing device 203). In other words, provided that the bandwidth (bit rate) of the multiplexed output line 12 is determined, limitations are imposed on the number of the input lines and each of the bandwidths of the input lines #1 to #N by the bandwidth of the multiplexed output line. Assume, for example, that the bit rate of the multiplexed output line is 2.4 Gbps (corresponding in bandwidth to 2.4 GHz). Then, up to 16 input lines can be accommodated when the bit rate of each input line is 150 Mbps (corresponding in bandwidth to 150 MHz).

The multiplexing device 203 can be implemented in several forms. The following description will be given of a multiplexing system in which each of the input lines #1 to #N is assigned the entire bandwidth of the multiplexed output line and a multiplexing system which can perform a statistical multiplexing-like function.

Figure 5:
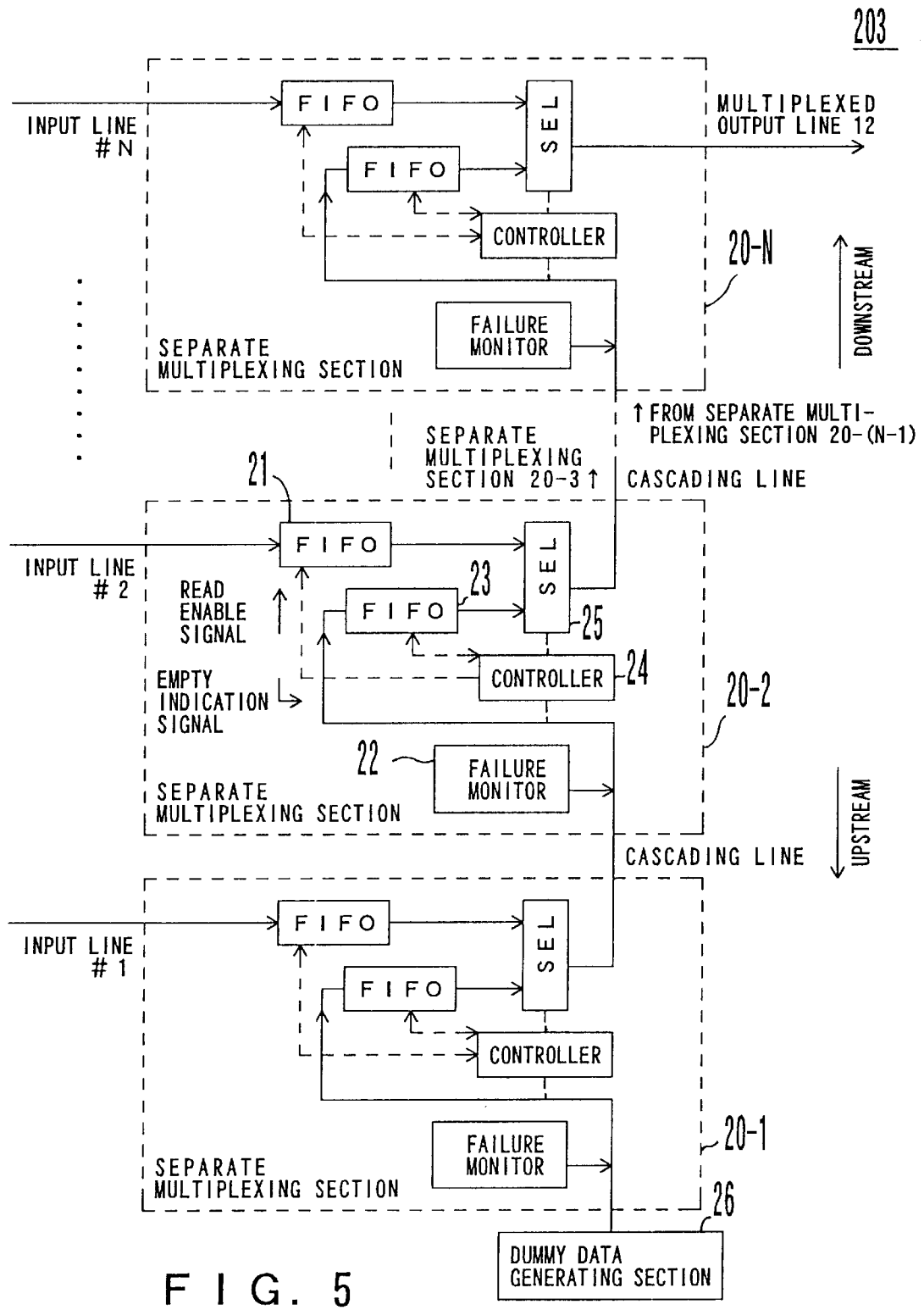
FIG. 5 shows an embodiment of a multiplexing arrangement of the present invention.

FIG. 5 shows an example of a multiplexing device of the present invention. This multiplexing device has separate multiplexing sections 20-1 to 20-N with which input lines #1 to #N are respectively associated. The separate multiplexing sections are connected in cascade as shown. Basically, the separate multiplexing sections all have the same arrangement. Here, the arrangement and operation of the separate multiplexing section will be described in terms of the separate multiplexing section 20-2.

A FIFO memory 21 stores a cell received over the input line #2. That is, the cell transferred over the input line #2 is written into the FIFO memory 21 at the speed of the input line #2. Note that no idle cell is written into the FIFO memory 21.

The separate multiplexing sections 20-1 to 20-N are connected in cascade by cascading lines. The bit rate of the cascading line is equal to that of the multiplexed output line 12. Each of the separate multiplexing sections receives not only a cell over a respective corresponding one of the input lines but also a cell from its adjacent upstream separate multiplexing section over the cascading line. More specifically, the separate multiplexing section 20-2 receives a cell sent from the separate multiplexing section 20-1 over the cascading line that connects the sections 20-1 and 20-2 together and the input line #2.

A failure monitor 22 detects a failure in the cascading line. The failure monitor in the separate multiplexing section 20-2 monitors the cascading line between the separate multiplexing sections 20-1 and 20-2 to determine if a clock signal and a cell frame signal are being transferred normally over that line.

A FIFO memory 23 stores a cell received over the cascading line. More specifically, a cell received over the cascading line between the separate multiplexing sections 20-1 and 20-2 is written into the FIFO memory 23 at the speed of that cascading line. No idle cell is written into the FIFO memory 23.

A controller 24 issues a read enable signal to read a cell out of the FIFO memory 21 or 23 and controls a selector 25 so that the read cell is output onto the cascading line. The controller 24 is responsive to a FIFO-empty indication signal from the FIFO memory 21 or 23 to determine whether a cell is stored in the FIFO memory 21 or 23. Here, the FIFO-empty signal goes high when no cell is stored in the corresponding FIFO memory 21 or 23.

When one or more cells are stored in the FIFO memory 23, the controller 24 reads one cell out from the FIFO memory 23. When a cell is read out of the FIFO memory 23, the controller 24 issues a select signal to the selector 25 so that the output of the FIFO memory 23 is selected. When there is no cell in the FIFO memory 23, on the other hand, the controller 24 reads a cell out of the FIFO memory 21. In this case, the controller 24 outputs a select signal to cause the selector 25 to select the output of the FIFO memory 21. When there is no cell in either of the FIFO memories 21 and 23, the controller 24 outputs an idle cell onto the cascading line.

Although, in the above arrangement, the cascading line is assigned higher priority than the input line in multiplexing cells, the input line may be assigned higher priority.

In this manner, the separate multiplexing section 20-2 multiplexes cells received over the input line #2 and the upstream cascading line connected to the adjacent upstream separate multiplexing section 20-1 and sends the multiplexed cells to the adjacent downstream separate multiplexing section 20-3 (not shown) over the downstream cascading line. The cell input to the separate multiplexing section 20-2 over the upstream cascading line is one received over the input line #1. That is, the separate multiplexing section 20-i (the i-th separate multiplexing section from the separate multiplexing section 20-1) multiplexes cells input from the input lines associated with the separate multiplexing sections upstream of the separate multiplexing section 20-i and a cell input from its associated input mine #i and sends those multiplexed cells to its adjacent downstream separate multiplexing section over the cascading line.

The separate multiplexing section 20-N, which is located the most downstream of all the separate multiplexing sections, multiplexes cells received over all the input lines #1 to #N. The output line connected to the separate multiplexing section 20-N forms the multiplexed output line 12.

The separate multiplexing section 20-1, which is located the most upstream of all the separate multiplexing sections, will not receive any cell from an upstream separate multiplexing section unlike the other separate multiplexing sections 20-2 to 20-N. For this reason, a dummy data generating section 26 is provided, which applies dummy data (an idle cell, a clock signal, a cell frame signal, etc,.) to the separate multiplexing section 20-1. In each of the separate multiplexing sections information is set as to whether or not it is placed in the most upstream position. The information may be set manually by users or may be set automatically by a general control unit (not shown) that controls every separate multiplexing section.

As described above, the multiplexing device of the present invention is arranged such that a number of separate multiplexing sections, each of which corresponds to a respective one of input lines, are connected in cascade and the most downstream separate multiplexing section provides an multiplexed output of the multiplexing device. Thus, to multiplex a number M (<=N) of input lines, these input lines need merely be connected to M separate multiplexing sections arbitrarily selected out of the separate multiplexing sections 20-1 to 20-N. Suppose, for example, that none of the input lines is connected to the separate multiplexing section 20-2. When a cell is stored in the FIFO memory 23, the controller 24 simply reads the cell out of the FIFO memory 23 and outputs it; otherwise, the controller 24 simply outputs an idle cell because, in this case, the FIFO memory 21 is empty all the time. That is, the separate multiplexing sections 20-1 to 20-N each act as a FIFO memory (buffer memory) when no input line is connected thereto. Thus, the multiplexing device of the present embodiment can be adapted to any change in the number of input lines to be multiplexed together.

Figure 6:
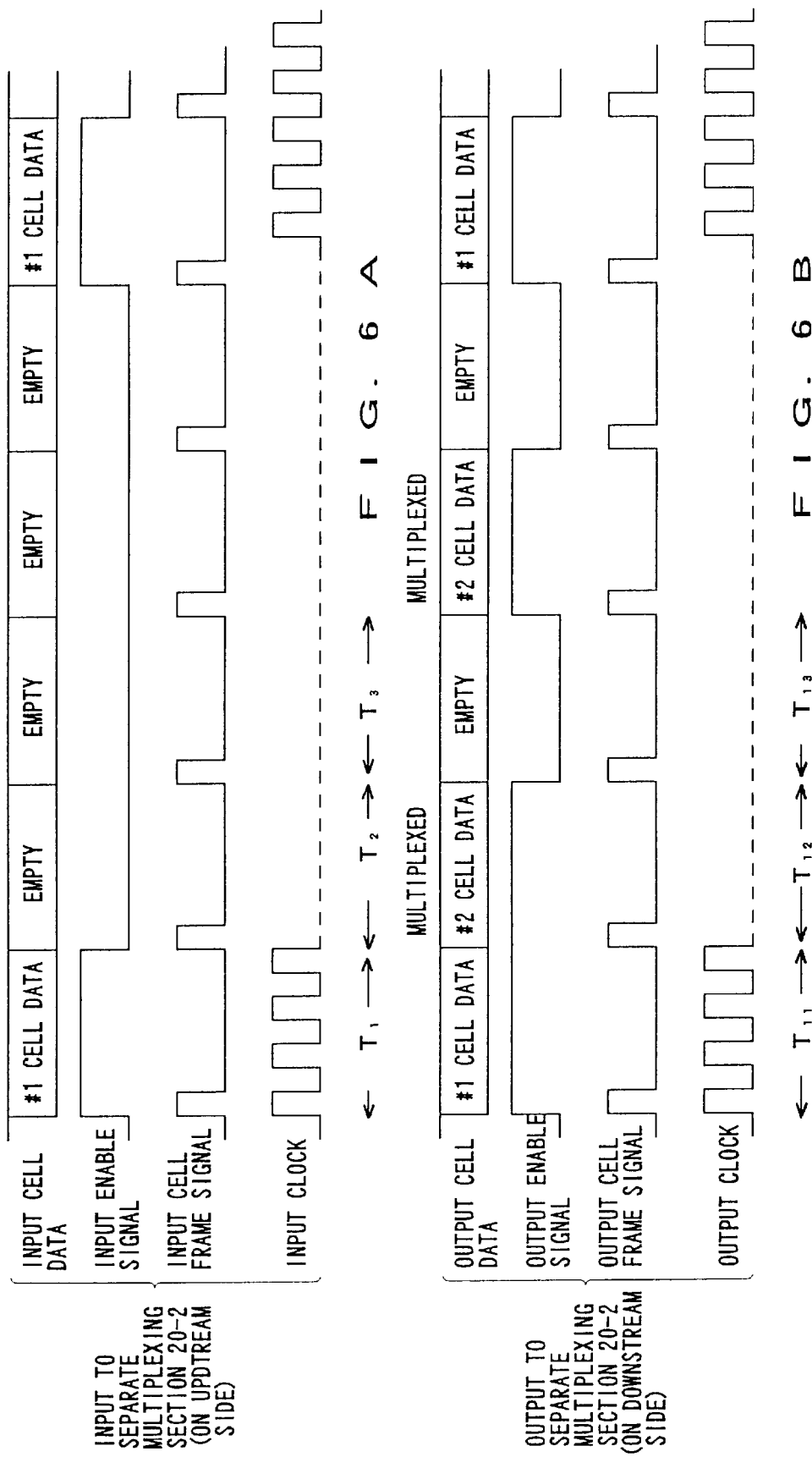
FIGS. 6A and 6B show signals transferred over the cascading lines in the multiplexer of FIG. 5.

FIGS. 6A and 6B show signals transferred over the cascading line in the multiplexing device of FIG. 5. Here, description will be given in terms of input and output signals of the separate multiplexing section 20-2.

On the cascading line cell data and control signals are transferred in parallel. The control signals comprise a clock signal, a cell frame signal, and a cell enable signal. The clock signal has the same frequency as a clock signal transferred over the multiplexed output line 12. The cell frame signal consists of pulses that appear at regular intervals to indicate the beginning of the individual cells. The cell enable signal goes to a high level when a cell to be transferred is effective or a low level when a cell to be transferred is an idle cell. The cell data consists of a header and a payload (including tag information under certain conditions) and is transferred in synchronism with the clock signal and the cell frame signal. The cell data is transferred in 8-bit parallel form, by way of example.

The operation of the separate multiplexing section 20-2 will be described below. In the following description, the times that define input timing are represented by time slots T1, T2, . . . , and the times that define output timing are represented by time slots T11, T12, . . . . It is assumed here that no cell has been stored in the FIFO memory 23 before the time slot T1.

The separate multiplexing section 20-2 receives an effective cell in the time slot T1. The effective cell means that it is not an idle cell and here corresponds to a cell received over the input line #1 (#1 cell data). The input enable signal is high in the time slot T1. Upon detecting that the input cell enable signal is high in the time slot T1, the separate multiplexing section 20-2 writes the cell received over the cascading line in the time slot T1 into the FIFO memory 23. Upon detecting that a cell is stored in the FIFO memory 23, the controller 24 reads the cell from the FIFO memory 23 regardless of whether or not a cell is stored in the FIFO memory 21 and outputs it over the cascading line in the time slot T11. In the time slot T11, the output enable signal is high.

In the time slot T2, the separate multiplexing section 20-2 receives an idle cell over the cascading line. At this point, the input enable signal is low. Thus, the idle cell received over the cascading line is discarded without being written into the FIFO memory 23. The FIFO memory 23 stores no cell because the cell received in the time slot T1 has already been read out. Upon detecting that the FIFO memory 23 is empty, the controller 24 examines whether or not a cell has been stored in the FIFO memory 21. Suppose here that the FIFO memory 21 stores a cell. Then, the controller 24 reads the cell out of the FIFO memory 21 and outputs it over the cascading line in the time slot T12. The output enable signal is high in the time slot T12.

Later the separate multiplexing section 20-2 receives an idle cell over the cascading line in the time slot T3. This idle cell is also discarded without being written into the FIFO memory 23. Upon detecting that the FIFO memory 23 is empty, the controller 24 examines whether or not a cell has been stored in the FIFO memory 21. Suppose here that no cell is stored in the FIFO memory 21. In this case, since a cell to be read is not stored in either of the FIFO memories 21 and 23, the controller 24 outputs an idle cell over the cascading line in the time slot T13. When an idle cell is output, the output enable signal is set low.

Thus, if a cell is stored in the FIFO memory connected to the cascading line, each of the separate multiplexing sections 20-1 to 20-N reads the cell out of the FIFO memory and outputs it. If, when no cell is stored in the FIFO memory connected to the cascading line, and when a cell is stored in the FIFO memory connected to the corresponding input line, each separate multiplexing section reads that cell out of the FIFO memory and outputs it. If no cell is stored in either of the FIFO memories, each separate multiplexing section outputs an idle cell. As a result, in the most downstream separate multiplexing section 20-N, cells received over the input lines #1 to #N are multiplexed together. Since the multiplexing device of the present invention makes it a condition that the sum of the bandwidths of the input lines #1 to #N is equal to or less than the bandwidth of the multiplexed output line 12, cells from the input lines #1 to #N are multiplexed on the multiplexed output line 12 without being discarded.

In addition, if there is an empty slot in a cell data stream sent from the adjacent upstream separate multiplexing section over the cascading line, each separate multiplexing section can send a cell inputted from the corresponding input line to its adjacent downstream separate multiplexing section in that empty slot. Here, the empty slot refers to a time interval during which an idle cell is transferred. Thus, if, under the circumstance that a plurality of cells are stored in the FIFO memory connected to the corresponding input line, empty slots appear in succession in a cell data stream sent from the adjacent upstream separate multiplexing section over the cascading line, each separate multiplexing section can output the cells stored in that FIFO memory in succession to its adjacent downstream separate multiplexing section using the empty slots.

By taking advantage of the above property, the statistical multiplexing effect can be obtained. That is, the condition that the sum of the bandwidths of the input lines #1 to #N must not exceed the bandwidth of the multiplexed output line 12 guarantees that, even if cells are sent at the full rate over each input line, none of the cells are discarded in the multiplexing device 203. Under actual operating conditions, however, a situation such that cells are transferred at the full rate over all the input lines cannot arise. Thus, idle cells will take up a substantial portion of the output of the multiplexing device 203. In other words, if, for example, the bit rate of the multiplexed output line is 2.4 Gbps and the bit rate of each input line is 150 Mbps, a maximum of 16 input lines can only be accommodated under the above condition. However, considering the statistical multiplexing effect, it is expected that more than 16 input lines can be accommodated without discarding a cell.

Figure 7:
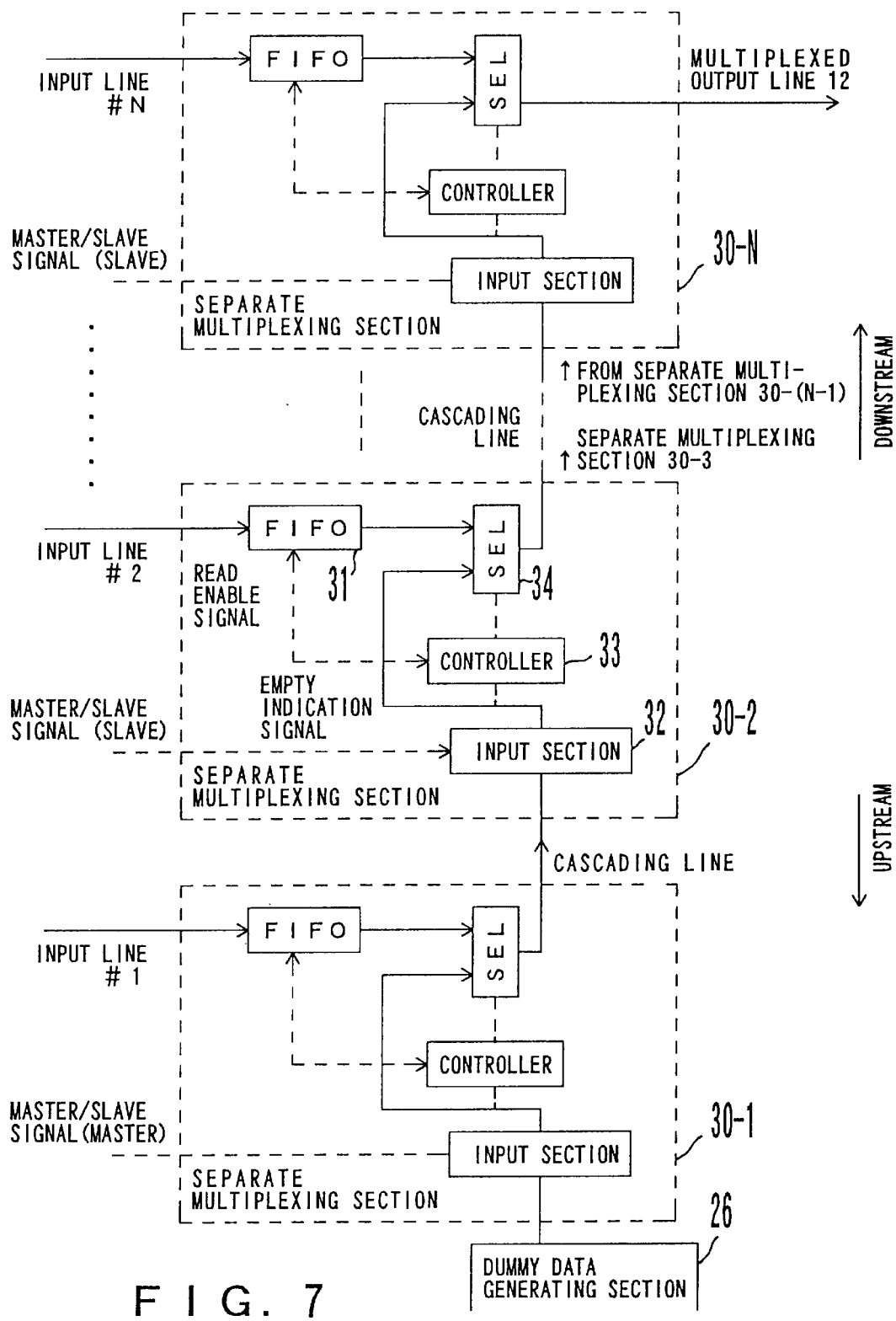
FIG. 7 shows another embodiment of the multiplexing arrangement of the present invention.

FIG. 7 shows an arrangement of another embodiment of the multiplexing device of the present invention. This multiplexing device has separate multiplexing sections 30-1 to 30-N with which input lines are respectively associated. As in the arrangement of FIG. 5, the separate multiplexing sections are connected in cascade by cascading lines. Basically, the separate multiplexing sections each have the same arrangement. Here, the arrangement and operation of the separate multiplexing section will be described in terms of the separate multiplexing section 30-2.

Like the FIFO memory 21 shown in FIG. 5, a FIFO memory 31 temporarily stores a cell input over the input line #2. An input section 32 receives cell data and a control signal sent from the adjacent upstream separate multiplexing section over the cascading line. The input section 32 receives a master/slave signal sent from a general control unit (not shown) that controls the whole operation of the multiplexing device 203, thereby determining whether or not the separate multiplexing section 30-2 is the most upstream one. When the separate multiplexing section 30-2 is not the most upstream one, the corresponding input section 32 allows cell data and a control signal sent from the adjacent upstream separate multiplexing section to pass through as they are. When the separate multiplexing section is the most upstream one, on the other hand, the input section 32 produces and outputs a cell frame signal and a token. The arrangement of the input section 32 and the token will be described later.

A controller 33 controls the outputting of a cell from the corresponding separate multiplexing section and produces a control signal to be sent to the adjacent downstream separate multiplexing section. That is, when a cell is received over the upstream cascading line, the controller 33 controls a selector 34 so that the cell is immediately sent over the downstream cascading line. In the absence of an incoming cell from the cascading line, the controller 33 examines whether a cell is stored in the FIFO memory 31. When a cell is stored in the FIFO memory 31, the controller 33 reads it out and then controls the selector 34 so as to send it over the downstream cascading line. Further, when no cell is received over the upstream cascading line and the FIFO memory 31 is empty, the controller 33 outputs an idle cell onto the downstream cascading line.

In this way, the separate multiplexing section 30-2, which remains basically unchanged from the separate multiplexing section 20-2 in FIG. 5, multiplexes cells inputted over the input line #2 and the cascading line connected to the adjacent upstream separate multiplexing section 30-1 and sends the multiplexed cells to the adjacent downstream separate multiplexing section 30-3 (not shown) over the cascading line. That is, the separate multiplexing section 30-i multiplexes a cell inputted over its associated input line #i and cells inputted over the input lines associated with the separate multiplexing sections upstream of the section 30-i and sends the multiplexed cells to the adjacent downstream separate multiplexing section over the cascading line. In the most upstream separate multiplexing section 30-N, therefore, cells received over all the input lines #1 to #N are multiplexed together.

FIGS. 8A and 8B show signals transferred over the cascading lines in the multiplexing device of FIG. 7. Here, a description is given in terms of the separate multiplexing section 30-2.

On the cascading line, cell data and control signals are transferred in parallel. The control signals include a token in addition to a clock signal, a cell frame signal, and a cell enable signal that are transferred in the arrangement of FIG. 5. In FIGS. 8A and 8B, the clock signal, the cell frame signal and the cell enable signal are omitted.

The token is a signal that grants multiplexing permission to the separate multiplexing sections 30-1 to 30-N. The token is produced in the most upstream separate multiplexing section (the separate multiplexing section 30-1 in the example of FIG. 7). Upon receipt of the token, each separate multiplexing section shifts the token by the duration of one time slot and then sends it to the next separate multiplexing section. One time slot refers to the time required to transfer one cell over the cascading line.

The operation of the separate multiplexing section will be described now. Assume here that four input lines (i.e., N=4) are connected to the multiplexing device of FIG. 7. Thus, the separate multiplexing section 30-1 is the most upstream one and the separate multiplexing sections 30-2 to 30-4 are connected in cascade on the downstream side of the separate multiplexing section 30-1. The master/slave signal sets the separate multiplexing section 30-1 to the master mode. The separate multiplexing sections 30-2 to 30-4 are each set to the slave mode. Further, the number-of-input-lines indication signal notifies the separate multiplexing section 30-1 that the number of input lines is four.

Having confirmed that the number of input lines is four, the separate multiplexing section 30-1 divides the bandwidth of the cascading line into four. That is, the separate multiplexing section 30-1 produces a token every four time slots and sends it over the cascading line simultaneously with cell data. As shown in FIGS. 8A and 8B, the token is a pulse signal the duration (width) of which corresponds to one time slot. The bandwidth of the cascading line is the same as that of the multiplexed output line 12.

As described previously, the token is a signal that grants multiplexing permission to the separate multiplexing sections 30-1 to 30-N. Thus, each separate multiplexing section will obtain a right of outputting one cell every four time slots.

The separate multiplexing section 30-2 receives an output from the separate multiplexing section 30-1 over the cascading line (see FIG. 8A). Assuming the times associated with input timing of the separate multiplexing section 30-2 to be represented by time slots T1, T2, . . . , the separate multiplexing section 30-2 receives the token in time slots T1, T5, . . . . These time slots T1, T5, . . . are ones assigned for the separate multiplexing section 30-1. Although, in FIGS. 8A and 8B, the first time slot of every four time slots is labeled "#1 CELL DATA", these time slots do not always hold a cell received over the input line #1. If, in the time slots assigned for the separate multiplexing section 30-1, no cell is stored in its FIFO memory 31, then idle cells will be placed in those time slots.

Upon receiving a token in the time slot T1, the separate multiplexing section 30-2 outputs a cell data received at the time slot T1 (#1 cell data) in the time slot T11. However, the separate multiplexing section 30-2 does not output a token in the time slot T11.

The separate multiplexing section 30-2 judges that the time slot next to the time slot (i.e., time slot T1) in which the token has been transferred is the one assigned to itself. In the time slot T12 next to the time slot T11, the separate multiplexing section 30-2 reads a cell out of the FIFO memory 31, provided that the memory is not empty, and then sends it over the cascading line on the downstream side. If the FIFO memory 31 is empty, the separate multiplexing section 30-2 outputs an idle cell onto the downstream cascading line. The separate multiplexing section 30-2 outputs the token in the time slot T12. The technique of outputting a token in synchronism with a time slot is well known and remains unchanged from the technique of producing a cell enable signal.

The time slots T3 and T4 are ones assigned for the separate multiplexing sections 30-3 and 30-4, respectively. In the time slots T13 and T14 corresponding to the time slots T3 and T4, therefore, the separate multiplexing section 30-2 sends cell data received from the adjacent upstream separate multiplexing section 30-1 to the adjacent downstream separate multiplexing section 30-3, as they were received with no token outputted.

Thus, the multiplexing device of FIG. 7 divides the bandwidth of the cascading line by the number of input lines to obtain time slots, assigns each of the time slots to a respective one of the input lines #1 to #N, and places cells received over the input lines #1 to #N in the corresponding time slots, thereby allowing cells received over the N input lines to be multiplexed on one multiplexed output line. At this point, the multiplexing timing of each separate multiplexing section is controlled by a token. The token system used in the present embodiment is arranged such that, as described previously, each separate multiplexing section presents the multiplexing timing to the adjacent downstream separate multiplexing section while shifting the timing of the token. For this reason, there is no need for any device that controls the multiplexing timing for each of the separate multiplexing sections 30-1 to 30-N.

FIG. 9 shows a specific arrangement of the input section 32 of FIG. 7. The arrangement of FIG. 9 is common to the input sections of the separate multiplexing sections 30-1 to 30-N.

The input section 32 receives a clock signal, a cell frame signal, a cell enable signal, cell data, and a token over the upstream cascading line. Note here that the input section of the most upstream separate multiplexing section (the separate multiplexing section 30-1 in FIG. 7) receives those signals from a dummy data generating section 26. The input section 32 further receives a master/slave signal and a number-of-input-lines indication signal from the general control unit, not shown. The input section 32 outputs a clock signal, a cell frame signal, a cell enable signal, cell data, a token, and an input interruption detect signal.

A clock detector 41 monitors the upstream cascading line to determine if a clock signal is being transferred normally. When an abnormal condition is detected, the detector 41 issues an alarm signal, which is then applied to an OR circuit 44. The abnormal conditions include a clock supply failure in which the entry of a clock signal is not detected for long than a fixed period of time and a clock frequency error in which the clock frequency becomes offset with respect to a given frequency. If the received clock is normal, the clock detector 41 outputs it as it is.

A cell frame detector 42 monitors the upstream cascading line to determine if a cell frame signal is being transferred normally and, when an abnormal condition is detected, issues an alarm signal. It is considered abnormal when the interval at which cell frame pulses arrive exceeds a given period of time. The alarm signal is applied to the OR circuit 44. If a cell frame signal received over the upstream cascading line is normal, then the cell frame detector 42 applies it to a selector 46.

A token detector 43 monitors the upstream cascading line to determine if tokens are being transferred normally and, when an abnormal condition is detected, issues an alarm signal. It is considered abnormal when the interval at which the tokens arrive exceeds a given period of time, which is defined, for example, by the product of the duration of one time slot and the number of input lines. The alarm signal is entered into the OR circuit 44. In the input section 32 in the most upstream separate multiplexing section, however, the token detector 43 produces no alarm signal. If a token received over the upstream cascading line is normal, then the token detector 43 applies that token to a selector 48.

An output of the OR circuit 44 is used as an input interruption signal. The way to employ this input interruption signal will be described later. The cell enable signal and cell data received over the upstream cascading line are allowed to pass through the input section 32 as they are.

A cell frame generator 45 generates a cell frame signal, which is in turn applied to the selector 46 and a token generator 47. The cell frame generator 45 has a clock generator that generates a clock signal with the same frequency as the clock signal transferred over the cascading line, arid a mod-k counter. Here, k=53, provided that a cell consists of 53 bytes and cell data are transferred in parallel on a byte-by-byte basis. Thus, the cell frame generator 45 generates one clock pulse, i.e., a cell frame signal, at intervals of the time required to transfer one cell. The cell frame generator 45 may be arranged to receive the above clock externally. Such an arrangement will save the need for provision of a clock generator for each input section.

Upon receipt of a master/slave signal at a 1 level (indicating master), the selector 46 selects the cell frame signal generated by the cell frame generator 45. When the master/slave signal is at a 0 level (indicating slave), the selector 46 selects a cell frame signal received over the upstream cascading line. That is, the most upstream separate multiplexing section generates a cell frame signal by itself, and the other separate multiplexing sections each use a cell frame signal transferred from the adjacent upstream separate multiplexing section.

When taught about the number of input lines associated with the multiplexing device by the number-of-input-lines indication signal, a token generator 47 generates tokens to suit the number of input lines. In FIG. 10 there is shown in block diagram form an arrangement of the token generator 47. A divide-by-N frequency divider 51 divides the frequency of the cell frame signal by a factor of N. The factor N, which is specified by the number-of-input-lines indication signal, corresponds to the number of input lines. Since the dividing factor N is externally set, the divide-by-N frequency divider 51 can divide the frequency of the cell frame signal by an arbitrary integer. Thus, when a dividing factor of four is specified by the number-of-input-lines indication signal, the frequency divider 51 produces one pulse signal each time it receives four cell frame pulses. An output of the frequency divider 51 is applied to a mod-k counter 52 as a timing indication signal.

Upon receipt of a timing indication signal, the mod-k counter 52 starts a count operation to count the rising edges of clocks up to k. Here, "k" is the same as that described in connection with the cell frame generator 45 and thus corresponds to the duration of one time slot. For example, k=53 when a cell consists of 53 bytes and cell data are transferred in parallel on a byte-by-byte basis. The mod-k counter 52 maintains its output at a high level for the interval that elapses from the start of a counting operation to the time when the rising edges of the clocks have been counted up to k. A counter's output signal at a high level is a token to be applied to the selector 48 of FIG. 9.

When receiving a master/slave signal at a high level (1) indicating master, the selector 48 selects a token generated by the token generator 47. When receiving a master/slave signal at a low level (0) indicating slave, the selector 48 selects a token received over the upstream cascading line. That is, the most upstream separate multiplexing section generates a token by itself, and the other separate multiplexing sections each use a token received from the adjacent upstream separate multiplexing section.

Thus, the input sections 32 of the separate multiplexing sections 30-1 to 30-N have the same arrangement, but they operate differently according to the master/slave signal applied thereto, that is, depending on whether or not they are placed in the most upstream position.

Hereinafter, a modification of the multiplexing device described with reference to FIGS. 7 to 10 will be described. This multiplexing device is identical in basic arrangement to that shown in FIG. 7 except for the input section and the controller. The control method used in this type of multiplexing arrangement is called the tag method.

FIGS. 11A–11C are diagrams for use in explanation of the operation of the tag-based multiplexing device. Assume here that the number of input lines is four. The most upstream separate multiplexing section (corresponding to the separate multiplexing section 30-1 in FIG. 7) produces cells on which tag information "1" to "4" are set up as shown in FIG. 11A and places them in time slots in a cyclical manner. Upon receipt of a cell on which tag information "1" has been set up, the controller in the separate multiplexing section 30-1 places a cell read out from the FIFO memory connected to the input line #1 in the time slot (indicated by "tag=#1) in which the cell with tag information "1" has been placed. As a result, cell data that is sent from the separate multiplexing section 30-1 over the downstream cascading line will contain that cell (#1 cell data) received over the input line #1 every four time slots as shown in FIG. 11B. That is, in the separate multiplexing section 30-1, each time a cell on which tag information "1" has been set up is received, a cell received over the input line #1 is multiplexed on the cascading line. If, when a cell with tag information "1" is received, and no cell is stored in the FIFO memory, then an idle cell will be outputted onto the cascading line.

The separate multiplexing section 30-2 receives a data stream shown in FIG. 11B as cell data transferred over the cascading line. In the separate multiplexing section 30-2, each time a cell with tag information "2" is received, a cell received over the input line #2 is multiplexed on the cascading line. Thus, cell data that are sent from the separate multiplexing section 30-2 over the downstream cascading line will contain a cell (#2 cell data) received over the input line #2 every four time slots as shown in FIG. 11C.

Likewise, in the separate multiplexing sections 30-3 and 30-4, cells received over the input lines #3 and #4 are multiplexed on the cascading line. As a result, each of the cells received over the input lines #1 to #4 is multiplexed in turn and transferred over the multiplexed output line 12.

Figure 12:
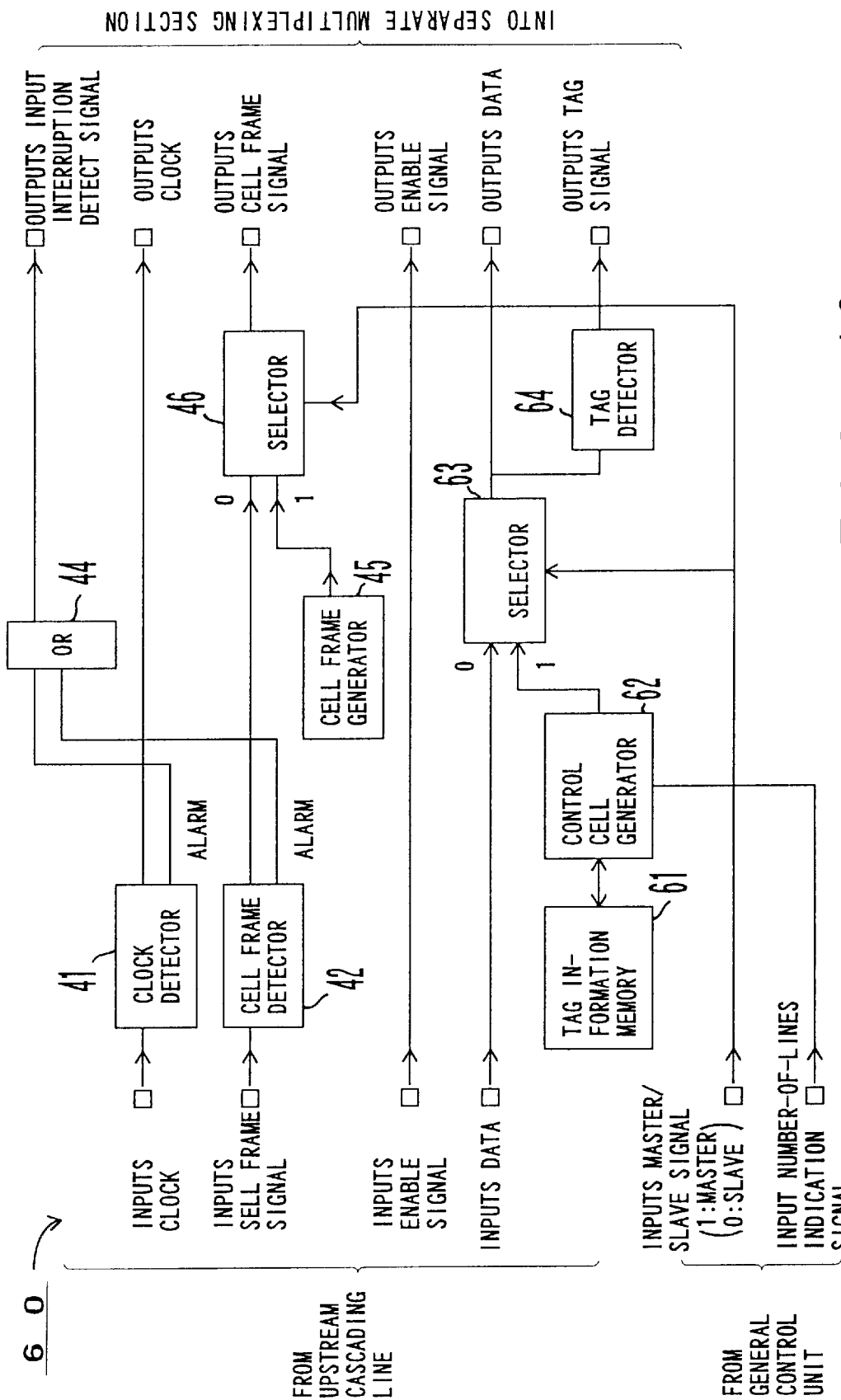
FIG. 12 shows an arrangement of the input section in each separate multiplexing section in the tag-based multiplexing arrangement.

FIG. 12 shows an arrangement of the input section in each separate multiplexing section of the tag-based multiplexing device. The input section (hereinafter termed the input section 60) receives a clock signal, a cell frame signal, a cell enable signal, and cell data from the adjacent upstream separate multiplexing section over the upstream cascading line. The input section 60 further receives a master/slave signal and a input-lines indication signal from the general control unit, not shown. An output signal of the input section 60 consists of a clock signal, a cell frame signal, a cell enable signal, cell data, an input interruption detect signal, and a tag signal. In FIG. 12, each of the clock detector 41, the cell frame detector 42, the OR circuit 44, the cell frame generator 45, and the selector 46, is the same as the corresponding unit shown in FIG. 9.

Figure 13:
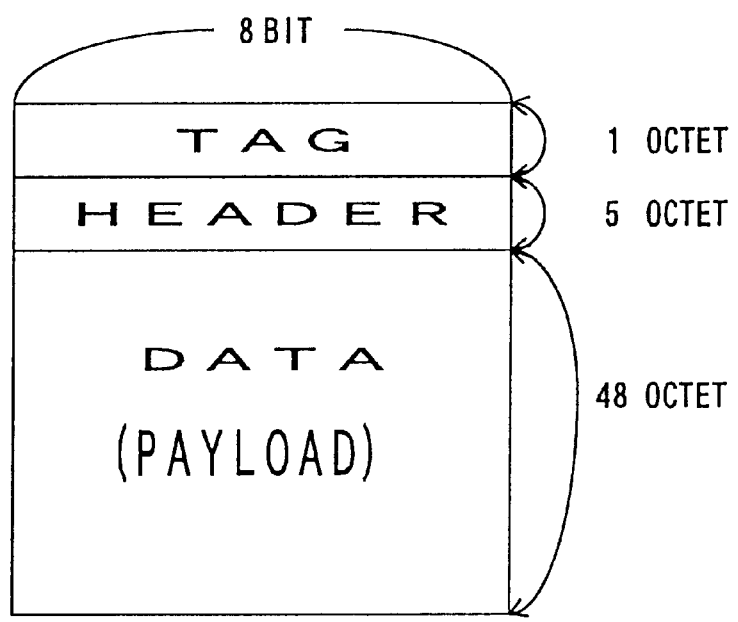
FIG. 13A shows an arrangement of the tag information memory of FIG. 12.
FIG. 13B shows the structure of a control cell.

A tag information memory 61 stores, as shown in FIG. 13A, pieces of 8-bit tag information in a one-to-one correspondence relationship with input line numbers. The tag information identifies each input line connected to the multiplexing device.

A control cell generator 62 accesses the tag information memory 61 in response to the input-line indication signal and then generates tag information using tag information retrieved from the tag information memory 61. The input-line indication signal, which is presented by the general control unit, not shown, indicates which of the separate multiplexing sections the input lines are connected with. For example, if an input line is connected to the separate multiplexing section 30-2, then the control cell generator 62 accesses the tag information memory 61 with "#2" as a key and retrieves "00000010" as tag information from the memory 61, as shown in FIG. 13A.

The control cell generator 62 generates a control cell such as shown in FIG. 13B. Tag information retrieved from the tag information memory 61 is added at the beginning of the control cell. Information stored in the header and payload of the control cell is not specifically defined.

If, for example, input lines #1 to #N are connected to the separate multiplexing sections 30-1 to 30-N, respectively, then the input-line indication signal will take the form of "#1, #2, ..., #N". In this case, the control cell generator 62 holds N pieces of tag information that have been retrieved from the tag information memory 61 with #1 to #N as keys, and generates N types of control cells each of which is headed by the corresponding tag information. The control cells are outputted in a cyclical manner.

The output of the control cell generator 62 is connected to an input of a selector 63, which has the other input connected to receive cell data transferred over the upstream cascading line.

Upon receipt of a master/slave signal at a high level indicating master, the selector 63 selects a control cell generated by the control cell generator 62. On the other hand, when the master/slave signal is a 0 to indicate slave, the selector 63 selects cell data transferred over the upstream cascading line. That is, the most upstream separate multiplexing section generates a control cell by itself, while the other separate multiplexing sections each use a control cell sent from the upstream side..

A tag information detector 64 receives an output of the selector 63 to detect tag information added at the beginning of a control cell. The result of detection is presented to the controller 33. If, for example, the tag detector 64 in the separate multiplexing section 30-1 shown in FIG. 7 receives a cell data stream as shown in FIG. 11A, it detects "00000001" to "00000100" in sequence as tag information corresponding to #1 to #4 and presents the detected tag information in sequence to the controller 33.

Although, in the above arrangement, each of the input sections 60 is equipped with a tag information memory 61 and a control cell generator 62, the arrangement may be modified such that a single tag information memory and a single control cell generator are provided for all the separate multiplexing sections 30-1 to 30-N. In this case, an output of the control cell generator is applied in common to each of the selectors 63 of the input sections 60 of the separate multiplexing sections 30-1 to 30-N.

The controller 33 in each of the separate multiplexing sections 30-1 to 30-N of the tag-based multiplexing device knows the identification number, 1, 2, . . . or N, of the separate multiplexing section to which it belongs. This number also identifies the input line which is connected to the (corresponding separate multiplexing section. For example, "1" has been set in advance as a line number in the controller 33 in the separate multiplexing section 30-1 to which the input line #1 is connected. When receiving pieces of tag information presented sequentially by the tag information detector 64, the controller 33 compares each of the line numbers specified by the pieces of tag information in turn with the line number that has been set in advance, as shown in FIG. 14. Only when the comparison indicates equality, the controller 33 issues a read enable signal. The read enable signal is used to read one cell out of the, FIFO memory connected to the input line. In this manner, the controller 33 can recognize the timing of multiplexing of a cell received over the input line by tag information, to multiplex that cell on the cascading line on a timely basis.

The tag-based multiplexing device described so far in connection with FIGS. 11 to 14 is arranged such that each of the separate multiplexing sections 30-1 to 30-N knows the timing of multiplexing by tag information added at the beginning of a control cell transferred over the cascading line. Alternatively, the arrangement may be modified such that, as shown in FIGS. 15A and 15B, data corresponding to tag information and cell data are sent simultaneously, in parallel, and each separate multiplexing section knows the multiplexing timing by that data corresponding to tag information.

As described above, the multiplexing device of the present embodiment makes it a condition that the sum of the bandwidths of the input lines #1 to #N is basically equal to or less than the bandwidth of the multiplexed output line 12. In other words, the number of input lines and the bandwidth of each input line can be determined with freedom, unless the sum of the bandwidths of the input lines exceeds the bandwidth of the multiplexed output line. The multiplexing device of the present embodiment can accommodate input lines having different bit rates (bandwidths). The input lines

1 to #N that can be accommodated assume their bit rates to be 150 Mbps, 45 Mbps, and 1.5 Mbps. Assuming, for example, that the bit rate of the multiplexed output line 12 is 2.4 Gbps (the bandwidth is 2.4 GHz), 10 input lines that run at a bit rate of 150 Mbps (bandwidth=150 MHz) and 10 input lines that run at a bit rate of 45 Mbps (bandwidth=45 MHz) can be accommodated under the above condition. In this case, however, in the arrangement shown in FIG. 7, there arises a possibility that cells may be discarded because the bandwidth of the multiplexed output line is equally assigned to each of the input lines #1 to #N. That is, when the bandwidth of the multiplexed output line is equally assigned to 20 input lines, each input line is assigned 120 MHz only. Under this situation, cells that are received over an input line which runs at a bit rate of 150 Mbps (a bandwidth of 150 MHz) will be discarded.

To circumvent this problem, there are two possible methods. The first method is to make a comparison between the sum of the bandwidths of the input lines #1 to #N and the bandwidth of the multiplexed output line on the assumption that each input line has the maximum bandwidth. In this case, even if input lines of 150 Mbps and input lines of 45 Mbps are mixed, each input line is considered to have a bit rate of 150 Mbps when making a decision as to whether the above condition is met. It thus follows that the multiplexing device can accommodate only 16 input lines at most. The other method is to assign the bandwidth of the multiplexed output line to the 20 input lines on a different basis depending on their respective bandwidths (as opposed to on an equal basis).

If the multiplexing device allows cells to be discarded, there is no necessity that the sum of the bandwidths of the input lines should be less than the bandwidth of the multiplexed output line.

Next, a description is given of an arrangement for, in the event of a failure in some of the separate multiplexing sections 20-1 to 20-N or 30-1 to 30-N in FIG. 5 or 7, reducing the effect of that failure on the multiplexing device to a minimum.

FIG. 16 shows a multiplexing device that has a function of reducing the effect of a failure. Here, the separate multiplexing sections 20-1 to 20-N in FIG. 5 or 30-1 to 30-N in FIG. 7 are simply represented by separate multiplexing sections #1 to #N.

Figure 16A:
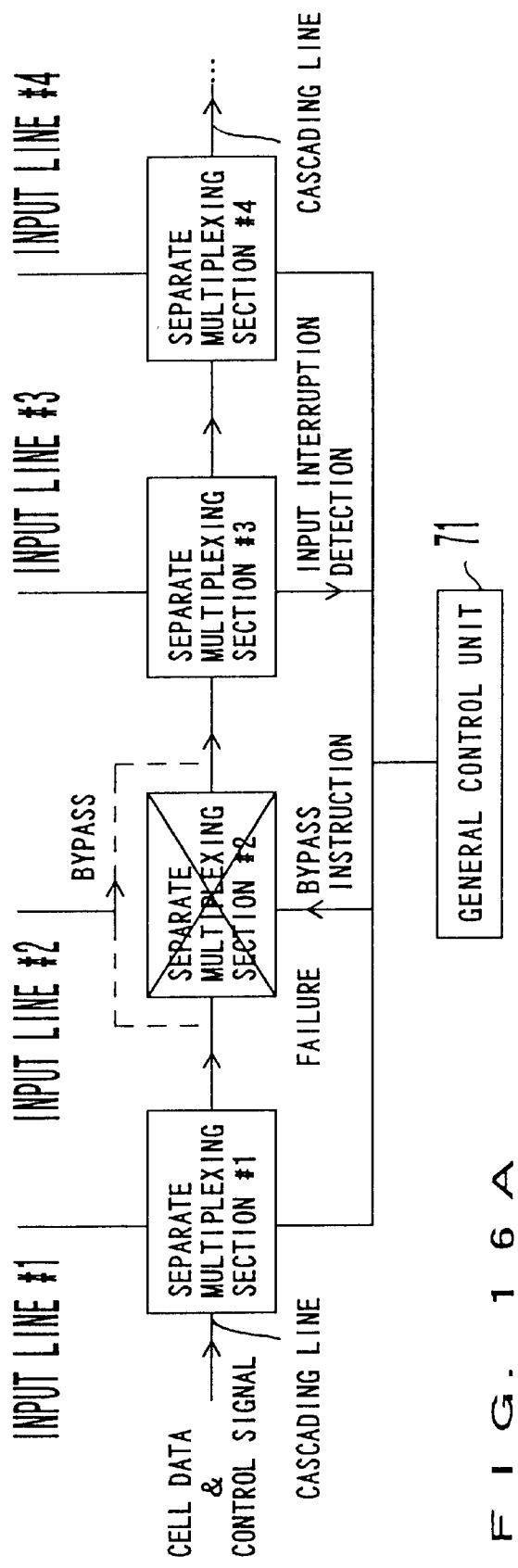
FIG. 16A shows a multiplexing arrangement having a function of reducing the effect of a failure on the multiplexing arrangement.

In FIG. 16A, there are illustrated separate multiplexing sections #1 to #4 as part of the separate multiplexing device. These are connected in cascade such that the separate multiplexing section #1 is the most upstream one and the separate multiplexing section #4 is the most downstream one among #1–#4. A general control unit 71 controls all the separate multiplexing sections #1 to #N. That is, the general control unit 71 supervises the status of each of the separate multiplexing sections #1 to #N and, upon detecting a failure, disconnects the separate multiplexing section that is the source of the failure from the multiplexing device, thereby protecting the input lines associated with the other separate multiplexing sections from the failure.

Assume, for example, that a failure has occurred in the separate multiplexing section #2 as shown in FIG. 16A. Then, the separate multiplexing section #3 will detect an abnormality in the clock or cell frame signal (or the token in the system of FIG. 9) through the cascading line. The abnormality is detected by a failure monitor 22 shown in the arrangement of FIG. 5 or by the clock detector 41, the cell frame detector 42, and the token detector 43 in the arrangement of FIG. 9 or FIG. 12. Upon detecting such an abnormality, the separate multiplexing section #3 presents an input interruption detect signal to the general control unit 71.

Upon receipt of the input interruption detect signal from the separate multiplexing section #3, the general control unit 71 considers a failure to have occurred in the separate multiplexing section #2 immediately upstream of the separate multiplexing section #3 and outputs a bypass instruction signal to the separate multiplexing section #2. In response to the bypass instruction signal, the separate multiplexing section #2 passes data (cell and control data) received over the upstream cascading line to the downstream cascading line as they are. In this state, cells received over other input lines than the input line #2 will be multiplexed on the multiplexed output line 12.

Figure 16B:
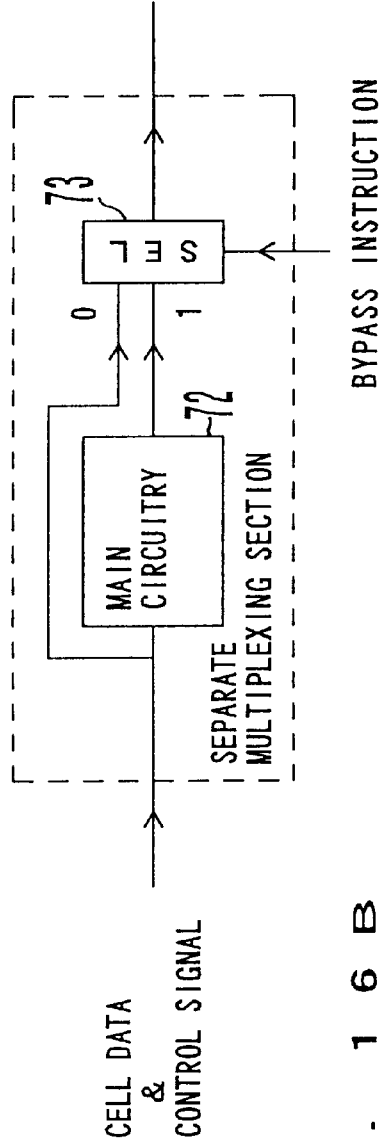
FIG. 16B shows a bypassing facility.

FIG. 16B shows an arrangement of a bypassing facility provided for each separate multiplexing section. In each separate multiplexing section, the upstream cascading line is connected to main circuitry 72 and an input of a selector 73. In the arrangement of FIG. 5, the main circuitry 72 comprises the FIFO memories 21 and 23, the failure monitor 22, the controller 24, and the selector 25. In the arrangement of FIG. 7, the main circuitry 72 comprises the FIFO memory 31, the input section 32, the controller 33, and the selector 34. The output of the main circuitry 72 is connected to the other input of the selector 73. The output of the selector 73 is connected to the downstream cascading line.

In the absence of a bypass instruction signal from the general control unit 71, the selector 73 selects the output of the main circuitry 72 to connect it to the downstream cascading line. When receiving a bypass instruction signal, on the other hand, the selector 73 allows data received over the upstream cascading line to be sent over the downstream cascading line as they are. Thus, the failing separate multiplexing section is bypassed.

In the event that failures have occurred in a plurality of separate multiplexing sections, the bypass processing is performed in the most upstream one of the failing separate multiplexing sections. When this bypass processing fails to restore the multiplexing device to normal operation, an attempt is made to perform the bypass processing in the downstream multiplexing section next to that most upstream one. If this attempt ends in failure, then the bypass processing is performed in the further adjacent downstream section.

When, in the above example, the separate multiplexing section #2 is recovered from the failure and hence the separate multiplexing section #3 ceases outputting the input interruption detect signal, the general control unit 71 resets the bypass instruction signal, thereby returning the separate multiplexing section #2 to the cascade connection.

FIG. 17 shows an arrangement of another example of the multiplexing device having a function of reducing the effect of a failure on the multiplexing arrangement. In the arrangement of FIG. 17, a general control unit 74 supervises the status of each separate multiplexing section and, upon detecting a failure, disconnects a separate multiplexing section which is the source of the failure and its upstream separate multiplexing sections from the multiplexing device, thereby preventing the failure from affecting the separate multiplexing sections downstream of that failed separate multiplexing section.

Upon receipt of an input interruption detect signal from the separate multiplexing section #3, the general control unit 74 considers the separate multiplexing section #2 immediately upstream of the separate multiplexing section #3 to have failed and then disconnects the failing separate multiplexing section #2 and the separate multiplexing section #1 from the separate multiplexing device. That is, the general control unit 74 sets the master/slave signal presented to the separate multiplexing section #3 to the master mode, thereby setting the separate multiplexing section #3 as the most upstream separate multiplexing section. In this state, incoming cells received over the input lines 3, 4, . . . will be multiplexed.

When, in the above example, the separate multiplexing section #2 is recovered from the failure and hence the separate multiplexing section #3 ceases outputting the input interruption detest signal, the general control unit 74 sets the separate multiplexing section #1 to the master mode and the separate multiplexing section #3 to the slave mode, thereby returning the separate multiplexing sections #1 and #2 to the cascade connection.

The embodiments of the present invention have been described in terms of an arrangement in which the multiplexing device is installed on the input side of the ATM switch. This is merely exemplary. The present invention is applicable to all of arrangements that multiplex cells received over a plurality of input lines on a single output line.

In addition, the present invention can be applied not only to an ATM system but also to systems that transfer data in the form of fixed length packets.

Unlike the conventional MUX system, in the arrangement in which input lines are connected in cascade and each input line is multiplexed in turn, there is no need for another multiplexing block (LSI of FIG. 1C) in order to accommodate more input lines than one multiplexing block can accommodate. Thus, the multiplexing arrangement of the present invention can flexibly adapt itself to any change in the number of input lines. In addition, unlike the conventional system, the multiplexing device of the invention allows high-speed multiplexing processing to be implemented because no WIRED-OR connection is used.

In the arrangement in which the bandwidth of the multiplexed output line is assigned to the input lines equally and periodically, each input line is multiplexed equally.

In the event that a failure occurs in a separate multiplexing section, only the failed separate multiplexing section or both the failed separate multiplexing section and its upstream separate multiplexing section are disconnected from the multiplexing device, allowing the affect of the failure on the multiplexing device to be reduced to a minimum.

What is claimed is:

1. A line multiplexing system for multiplexing fixed length packets received over a plurality of input lines on a multiplexed output line comprising:
    a plurality of separate multiplexing units with which the input lines are connected respectively; and
    cascading lines for connecting the separate multiplexing units in cascade, wherein
        each of said separate multiplexing units multiplexes a fixed length packet received over the upstream cascading line and a fixed length packet received over the corresponding input line giving a higher priority to the fixed length packet from the upstream cascading line, and outputs the multiplexed fixed length packets on the downstream cascading line, and wherein
        the most downstream separate multiplexing unit among said plurality of separate multiplexing units outputs the multiplexed fixed length packets on the multiplexed output line.

2. The system according to claim 1, wherein the speed at which the cascading lines run is equal to that at which the multiplexed output line runs.

3. The system according to claim 1, wherein each of the separate multiplexing units includes:
    input monitoring means for monitoring the upstream cascading line to determine whether signals are transferred properly and producing an alarm signal when an abnormality is detected; and
    bypass means for bypassing signals received over the upstream cascading line to the downstream cascading line,
    and the system further comprises a general control unit responsive to reception of an alarm signal from one of the separate multiplexing units for bypassing the separate multiplexing unit immediately upstream of the separate multiplexing unit that is the source of the alarm signal.

4. The system according to claim 1, wherein each of the separate multiplexing units includes:
    input monitoring means for monitoring the upstream cascading line to determine whether signals are transferred properly and producing an alarm signal when an abnormality is detected;
    and bypass means for bypassing signals received over the upstream cascading line to the downstream cascading line,
    and the system further comprises a general control unit responsive to reception of an alarm signal from one or more separate multiplexing units for bypassing the separate multiplexing unit immediately upstream of the most upstream separate multiplexing unit among the separate multiplexing units that are the sources of the alarm signal.

5. The system according to claim 1, wherein each of the separate multiplexing units includes input monitoring means for monitoring the upstream cascading line to determine whether signals are transferred properly and producing an alarm signal when an abnormality is detected,
    and the system further comprises a general control unit responsive to reception of an alarm signal from one of the separate multiplexing units for disconnecting one or more separate multiplexing unit connected upstream of the separate multiplexing unit that produced the alarm signal and replacing the separate multiplexing unit that produced the alarm signal in the most upstream position.

6. The system according to claim 1, wherein each of the separate multiplexing units includes input monitoring means for monitoring the upstream cascading line to determine whether signals are transferred properly and producing an alarm signal when an abnormality is detected,
    and the system further comprises a general control unit responsive to reception of an alarm signal from one or more separate multiplexing units for disconnecting one or more separate multiplexing unit connected upstream of the most upstream separate multiplexing unit among the separate multiplexing units that produced the alarm signal and replacing the most upstream separate multiplexing unit that produced the alarm signal in the most upstream position.

7. The system according to claim 1, wherein each of the separate multiplexing units includes input monitoring means for monitoring the upstream cascading line and producing an alarm signal when the clock signal is not received for more than a predetermined period of time.

8. The system according to claim 1, wherein each of the separate multiplexing units includes input monitoring means for monitoring the upstream cascading line and producing an alarm signal when the packet frame signal is not received for more than a predetermined period of time.

9. A line multiplexing system for multiplexing fixed length packets received over a plurality of input lines on a multiplexed output line comprising:
- a plurality of separate multiplexing units with which the input lines are connected respectively; and
- cascading lines for connecting the separate multiplexing units in cascade, wherein:
  - each of said separate multiplexing units multiplexes a fixed length packet received over the upstream cascading line and a fixed length packet received over the corresponding input line and outputs the multiplexed fixed length packets on the downstream cascading line,
  - the most downstream separate multiplexing unit among said plurality of separate multiplexing units outputs the multiplexed fixed length packets on the multiplexed output line, and
  - the bandwidth of the multiplexed output line is equal to or greater than the sum of the bandwidths of said plurality of input lines.

10. A line multiplexing system for multiplexing fixed length packets received over a plurality of input lines on a multiplexed output line comprising:
- a plurality of separate multiplexing units with which the input lines are connected respectively; and
- cascading lines for connecting the separate multiplexing units in cascade, wherein:
  - each of said separate multiplexing units multiplexes a fixed length packet received over the upstream cascading line and a fixed length packet received over the corresponding input line and outputs the multiplexed fixed length packets on the downstream cascading line,
  - the most downstream separate multiplexing unit among said plurality of separate multiplexing units outputs the multiplexed fixed length packets on the multiplexed output line, and
  - each of said plurality of multiplexing units includes:
    - a first FIFO memory for storing a fixed length packet received over the corresponding input line;
    - a second FIFO memory for storing a fixed length packet from the upstream cascading line; and
    - a controller for, when a fixed length packet is stored in the second FIFO memory, reading the fixed length packet out of the second FIFO memory, and, when no fixed length packet is stored in the second FIFO memory, reading a fixed length packet out of the first FIFO memory, the read fixed length packet being output on the downstream cascading line.

11. A multiplexing system for multiplexing fixed length packets received over a plurality of input lines on a multiplexed output line the bandwidth of which is equal to or greater than the sum of the bandwidths of the input lines, comprising:
- a plurality of separate multiplexing units with which the input lines are connected respectively;
- cascading lines for connecting the separate multiplexing units in cascade; and
- a multiplexing permission signal generating unit for generating a multiplexing permission signal every period $N \times T$ where N is the number of the input lines and T is the time required to transfer a fixed length packet over the cascading line, and sanding it over the cascading line, wherein
  - each of said separate multiplexing units multiplexes a fixed length packet received over the upstream cascading line and a fixed length packet received over the corresponding input line and outputs the multiplexed fixed length packets on the downstream cascading line, and wherein
  - each of said separate multiplexing units outputs a fixed length packet received over the corresponding input line on the downstream cascading line on receiving the multiplexing permission signal, and wherein
  - the most downstream separate multiplexing unit among said plurality of separate multiplexing units outputs the multiplexed fixed length packets on the multiplexed output line.

12. The system according to claim 11, wherein each of said separate multiplexing units shifts the multiplexing permission signal by the time T.

13. The system according to claim 11, wherein each of the multiplexing units includes:
- a FIFO memory for storing a fixed length packet received over the corresponding input line; and
- a controller for, at the time when the multiplexing permission signal is received, reading a fixed length packet out of the FIFO memory and outputting the read fixed length packet on the downstream cascading line, and, at the time when no multiplexing permission signal is received, outputting a fixed length packet received from the upstream cascading line on the downstream cascading line.

14. The system according to claim 11, wherein
- a line identification number is set up on each of said separate multiplexing units to identify its associated input line, and wherein
- each of said separate multiplexing units adds a tag information generated corresponding to the set line identification number to a fixed length packet received over the corresponding input line and outputs the fixed length packet on receiving the multiplexing permission signal.

15. The system according to claim 11, wherein the speed at which the cascading lines run is equal to that at which the multiplexed output line runs.

16. The system according to claim 11, wherein each of the separate multiplexing units includes:
- input monitoring means for monitoring the upstream cascading line to determine whether signals are transferred properly and producing an alarm signal when an abnormality is detected; and
- bypass means for bypassing signals received over the upstream cascading line to the downstream cascading line,
- and the system further comprises a general control unit responsive to reception of an alarm signal from one of the separate multiplexing units for bypassing the separate multiplexing unit immediately upstream of the separate multiplexing unit that is the source of the alarm signal.

17. The system according to claim 11, wherein each of the separate multiplexing units includes:
- input monitoring means for monitoring the upstream cascading line to determine whether signals are transferred properly and producing an alarm signal when an abnormality is detected;

and bypass means for bypassing signals received over the upstream cascading line to the downstream cascading line, and the system further comprises a general control unit responsive to reception of an alarm signal from one or more separate multiplexing units for bypassing the separate multiplexing unit immediately upstream of the most upstream separate multiplexing unit among the separate multiplexing units that are the sources of the alarm signal.

18. The system according to claim 11, wherein each of the separate multiplexing units includes input monitoring means for monitoring the upstream cascading line to determine whether signals are transferred properly and producing an alarm signal when an abnormality is detected, and the system further comprises a general control unit responsive to reception of an alarm signal from one of the separate multiplexing units for disconnecting one or more separate multiplexing unit connected upstream of the separate multiplexing unit that produced the alarm signal and replacing the separate multiplexing unit that produced the alarm signal in the most upstream position.

19. The system according to claim 11, wherein each of the separate multiplexing units includes input monitoring means for monitoring the upstream cascading line to determine whether signals are transferred properly and producing an alarm signal when an abnormality is detected, and the system further comprises a general control unit responsive to reception of an alarm signal from one or more separate multiplexing units for disconnecting one or more separate multiplexing unit connected upstream of the most upstream separate multiplexing unit among the separate multiplexing units that produced the alarm signal and replacing the most upstream separate multiplexing unit that produced the alarm signal in the most upstream position.

20. The system according to claim 11, wherein each of the separate multiplexing units includes input monitoring means for monitoring the upstream cascading line and producing an alarm signal when the multiplexing permission signal is not received for the time N×T.

21. The system according to claim 11, wherein each of the separate multiplexing units includes input monitoring means for monitoring the upstream cascading line and producing an alarm signal when the clock signal is not received for more than a predetermined period of time.

22. The system according to claim 11, wherein each of the separate multiplexing units includes input monitoring means for monitoring the upstream cascading line and producing an alarm signal when the packet frame signal is not received for more than a predetermined period of time.

23. A multiplexing system for multiplexing fixed length packets received over a plurality of input lines on a multiplexed output line, the bandwidth of which is equal to or greater than the sum of the bandwidths of the input lines, comprising:

a plurality of separate multiplexing units with which the input lines are connected respectively, a line identification number being set up on each of the multiplexing units to identify its associated input line;

cascading lines for connecting the separate multiplexing units in cascade; and a packet generating unit for generating a plurality of fixed length packets each having tag information corresponding to a respective one of the line identification numbers, and sequentially sending each of the fixed length packets over the cascading line, wherein each of said separate multiplexing units multiplexes a fixed length packet received over the upstream cascading line and a fixed length packet received over the corresponding input line and outputs the multiplexed fixed length packets on the downstream cascading line, and wherein each of said separate multiplexing units outputs a fixed length packet received over the corresponding input line on the downstream cascading line, when the line identification number specified by tag information added to a fixed length packet received from the upstream cascading line coincides with the line identification number for the associated input line; and wherein the most downstream separate multiplexing unit among said plurality of separate multiplexing units outputs the multiplexed fixed length packets on the multiplexed output line.

24. The system according to claim 23, wherein the speed at which the cascading lines run is equal to that at which the multiplexed output line runs.

25. The system according to claim 23, wherein each of the separate multiplexing units includes:

input monitoring means for monitoring the upstream cascading line to determine whether signals are transferred properly and producing an alarm signal when an abnormality is detected; and bypass means for bypassing signals received over the upstream cascading line to the downstream cascading line, and the system further comprises a general control unit responsive to reception of an alarm signal from one of the separate multiplexing units for bypassing the separate multiplexing unit immediately upstream of the separate multiplexing unit that is the source of the alarm signal.

26. The system according to claim 23, wherein each of the separate multiplexing units includes:

input monitoring means for monitoring the upstream cascading line to determine whether signals are transferred properly and producing an alarm signal when an abnormality is detected;

and bypass means for bypassing signals received over the upstream cascading line to the downstream cascading line, and the system further comprises a general control unit responsive to reception of an alarm signal from one or more separate multiplexing units for bypassing the separate multiplexing unit immediately upstream of the most upstream separate multiplexing unit among the separate multiplexing units that are the sources of the alarm signal.

27. The system according to claim 11, wherein each of the separate multiplexing units includes input monitoring means for monitoring the upstream cascading line to determine whether signals are transferred properly and producing an alarm signal when an abnormality is detected, and the system further comprises a general control unit responsive to reception of an alarm signal from one of the separate multiplexing units for disconnecting one or more separate multiplexing unit connected upstream of the separate multiplexing unit that produced the alarm signal and replacing the separate multiplexing unit that produced the alarm signal in the most upstream position.

28. The system according to claim 23, wherein each of the separate multiplexing units includes input monitoring means for monitoring the upstream cascading line to determine whether signals are transferred properly and producing an alarm signal when an abnormality is detected, and the system further comprises a general control unit responsive to reception of an alarm signal from one or more separate multiplexing units for disconnecting one or more separate multiplexing unit connected upstream of the most upstream separate multiplexing unit among the separate multiplexing units that produced the alarm signal and replacing the most upstream separate multiplexing unit that produced the alarm signal in the most upstream position.

29. The system according to claim 23, wherein each of the separate multiplexing units includes input monitoring means for monitoring the upstream cascading line and producing an alarm signal when the clock signal is not received for more than a predetermined period of time.

30. The system according to claim 23, wherein each of the separate multiplexing units includes input monitoring means for monitoring the upstream cascading line and producing an alarm signal when the packet frame signal is not received for more than a predetermined period of time.

31. A line multiplexing system for multiplexing fixed length packets received over a plurality of input lines on a multiplexed output line comprising:

a plurality of separate multiplexing units with which the input lines are connected respectively; and cascading lines for connecting the separate multiplexing units in cascade, each of the separate multiplexing units multiplexing a fixed length packet received over the upstream cascading line and a fixed length packet received over the corresponding input line, while giving a higher priority to the fixed length packet from the corresponding input line, and output the multiplexed fixed length packets on the downstream cascading line, and the output of the most downstream multiplexing unit of said plurality of separate multiplexing units being a multiplexed output signal on the multiplexed output line.

32. A line multiplexing system for multiplexing fixed length packets received over a plurality of input lines on a multiplexed output line comprising:

a plurality of separate multiplexing units with which the input lines are connected respectively; and cascading lines for connecting the separate multiplexing units in cascade, each of the separate multiplexing units receiving a fixed length packet and a multiplex control signal over the upstream cascading line and multiplexing the fixed length packet from the upstream cascading line and a fixed length packet received over the corresponding input line on the downstream cascading line according to the multiplex control signal from the upstream cascading line.

* * * * *